United States Patent
Nagai

(10) Patent No.: US 10,996,108 B2
(45) Date of Patent: May 4, 2021

(54) WAVELENGTH SHIFT CORRECTION SYSTEM AND WAVELENGTH SHIFT CORRECTION METHOD

(71) Applicant: KONICA MINOLTA, INC., Chiyoda-ku (JP)

(72) Inventor: Yoshiroh Nagai, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/641,010

(22) PCT Filed: May 29, 2018

(86) PCT No.: PCT/JP2018/020448
§ 371 (c)(1),
(2) Date: Feb. 21, 2020

(87) PCT Pub. No.: WO2019/039025
PCT Pub. Date: Feb. 28, 2019

(65) Prior Publication Data
US 2021/0033458 A1    Feb. 4, 2021

(30) Foreign Application Priority Data
Aug. 22, 2017 (JP) .............................. JP2017-159292

(51) Int. Cl.
*G01J 3/02* (2006.01)
*G01J 3/10* (2006.01)
*G01J 3/06* (2006.01)

(52) U.S. Cl.
CPC ............... *G01J 3/10* (2013.01); *G01J 3/0229* (2013.01); *G01J 3/06* (2013.01)

(58) Field of Classification Search
CPC ........ G01J 3/10; G01J 3/02; G01J 3/26; G01J 3/28; G01J 3/36; G01J 3/0229; G01J 3/06
See application file for complete search history.

(56) References Cited

U.S. PATENT DOCUMENTS

| 5,771,094 A | 6/1998 | Carter et al. |
| 6,002,990 A | 12/1999 | Hanna |

(Continued)

FOREIGN PATENT DOCUMENTS

| JP | 9-15048 | 1/1997 |
| JP | 2004-191244 | 7/2004 |

(Continued)

*Primary Examiner* — Abdullahi Nur
(74) *Attorney, Agent, or Firm* — Cozen O'Connor

(57) ABSTRACT

A system and method include a wavelength shift correction light source emitting wavelength shift correction emission-line light and a spectrometer including: a spectroscopic unit receiving with photoelectric conversion elements rays of dispersed spectral light obtained by dispersing incident light based on wavelength, and outputs electrical signals corresponding to light intensities of the rays of dispersed spectral light; and a unit that measures temperature of the spectroscopic unit. When the wavelength shift correction emission-line light is measured as the incident light with the spectrometer, this system and method determine wavelength shift correction time emission-line wavelength corresponding to wavelength shift correction emission-line light, based on electrical signals from photoelectric conversion elements receiving wavelength shift correction emission-line light, and the measured temperature. The system and method determine wavelength variation from the difference between determined wavelength shift correction time emission-line wavelength and known emission-line wavelength of the wavelength shift correction emission-line light.

20 Claims, 9 Drawing Sheets

(56) References Cited

U.S. PATENT DOCUMENTS

2009/0066934 A1    3/2009  Gao et al.
2012/0150471 A1*   6/2012  Muto ...................... G01J 3/462
                                                          702/104

FOREIGN PATENT DOCUMENTS

| JP | 2005-43153  | 2/2005  |
| JP | 2005-69750  | 3/2005  |
| JP | 2005-338021 | 12/2005 |

* cited by examiner

| WAVELENGTH (nm) | SENSITIVITY GAIN PRODUCT |
|---|---|
| 720 | SGMa |
| 721 | SGMb |
| 722 | SGMc |
| ⋮ | ⋮ |
| ⋮ | ⋮ |
| 729 | SGMi |

| TEMPERATURE | RATIO OF COUNT RATIO |
|---|---|
| $T_1$ | CRa |
| $T_2$ | CRb |
| $T_3$ | CRc |
| ⋮ | ⋮ |
| ⋮ | ⋮ |
| $T_{10}$ | CRj |

WAVELENGTH SHIFT CORRECTION SYSTEM AND WAVELENGTH SHIFT CORRECTION METHOD

RELATED APPLICATIONS

This is a U.S. National Phase Application under 35 USC 371 of International Application PCT/JP2018/020448 filed on May 29, 2018.

This application claims the priority of Japanese application no. 2017-159292 filed Aug. 22, 2017, the entire content of which is hereby incorporated by reference.

TECHNICAL FIELD

The present invention relates to a wavelength shift correction system and a wavelength shift correction method for correcting wavelength shifts of a spectrometer.

BACKGROUND ART

A spectrometer measures the spectrum of the light to be measured. Therefore, when a spectrometer is used, it is important to correct wavelength shifts caused by aging or the like, for example. A technique relating to this wavelength shift correction is disclosed in Patent Literature 1, for example.

A wavelength shift correction system disclosed in Patent Literature 1 includes: a wavelength shift correction light source that outputs an emission line of a known emission-line wavelength; a spectral luminance meter to be subjected to wavelength shift correction that includes a light receiving unit formed with aligned photoelectric conversion elements that receive light dispersed in accordance with the wavelength of incident light and output electrical signals corresponding to the light intensities of the respective received wavelength components, and measures an emission line output of the wavelength shift correction light source; and a wavelength shift correcting unit that estimates the wavelength of the emission line output from relative outputs of the light receiving unit at a plurality of measurement wavelengths adjacent to the emission-line wavelength, estimates a wavelength variation from the difference between the estimated wavelength of the emission line output and the known emission-line wavelength, and performs wavelength shift correction on the spectral luminance meter to be subjected to wavelength shift correction, in a case where the spectral luminance meter to be subjected to wavelength shift correction measures the emission line output of the wavelength shift correction light source.

Meanwhile, an output of a photoelectric conversion element is normally amplified by an amplification circuit, is converted into a digital signal by an analog-digital conversion circuit, and is then subjected to signal processing for wavelength shift correction by a signal processing circuit such as a CPU or a DSP, for example. However, in a case where some or all of the circuits in the stages before the signal processing circuit have temperature characteristics, and the temperature at the time of calibration (initial calibration) during manufacture or before shipment differs from the temperature at a time of wavelength shift correction, for example, errors occur in the wavelengths required for the wavelength shift correction due to the temperature characteristics, and the accuracy of the wavelength shift correction deteriorates.

CITATION LIST

Patent Literature

Patent Literature 1: JP 2005-43153 A

SUMMARY OF INVENTION

The present invention has been made in view of the above circumstances, and an object thereof is to provide a wavelength shift correction system and a wavelength shift correction method capable of reducing deterioration of the accuracy of wavelength shift correction even in a case where the temperature at the time of calibration during manufacture or before shipment, for example, differs from the temperature at a time of wavelength shift correction.

To achieve the above object, a wavelength shift correction system and a wavelength shift correction method reflecting one aspect of the present invention include: a wavelength shift correction light source that emits wavelength shift correction emission-line light; and a spectrometer including: a spectroscopic unit that receives, with a plurality of photoelectric conversion elements, respective rays of dispersed spectral light obtained by dispersing incident light in accordance with wavelength, and outputs the respective electrical signals corresponding to the respective light intensities of the respective rays of dispersed spectral light; and a temperature measuring unit that measures the temperature of the spectroscopic unit. In a case where the wavelength shift correction emission-line light is measured as the incident light with the spectrometer, the wavelength shift correction system determines the wavelength shift correction time emission-line wavelength corresponding to the wavelength shift correction emission-line light, on the basis of the respective electrical signals output from a plurality of specific photoelectric conversion elements that receive the wavelength shift correction emission-line light, and the temperature measured by the temperature measuring unit. The wavelength shift correction system then determines a wavelength variation from the difference between the determined wavelength shift correction time emission-line wavelength and the known emission-line wavelength of the wavelength shift correction emission-line light, to perform wavelength shift correction on the spectrometer.

The advantages and features afforded by one or more embodiments of the invention will be more fully understood from the detailed description provided below and the accompanying drawings. The detailed description and the accompanying drawings are given by way of examples only, and are not intended as a definition of limitations of the invention.

BRIEF DESCRIPTION OF DRAWINGS

FIG. 10 is a diagram showing a first table stored in the spectrometer.

FIG. 11 is a diagram showing a second table stored in the spectrometer.

DESCRIPTION OF EMBODIMENTS

Figure 1A:
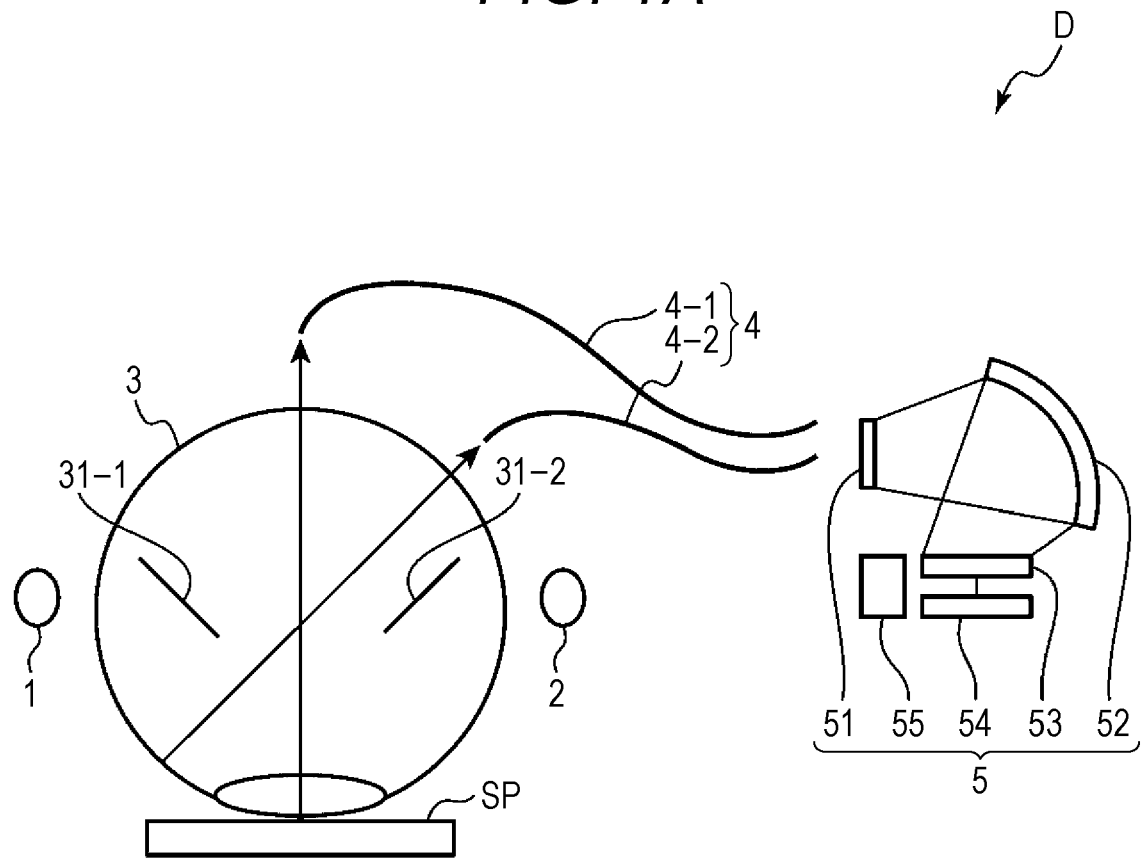
FIG. 1 is a schematic configuration diagram showing the optical configuration of a spectrometer incorporating a wavelength shift correction system according to an embodiment.

The following is a description of one or more embodiments of the present invention, with reference to the drawings. However, the scope of the invention is not limited to the disclosed embodiment(s). It should be noted that components denoted by like reference numerals in the respective drawings are like components, and explanation thereof will not be skipped where appropriate. In this specification, like components are generically denoted by a reference numeral without any suffix, and individual components are denoted by reference numerals accompanied by suffixes.

A wavelength shift correction system in an embodiment is a system that performs wavelength shift correction on a spectrometer after using the spectrometer that has been subjected to calibration (initial calibration) at the factory or the like during manufacture or before shipment, for example. Such a wavelength shift correction system includes: a wavelength shift correction light source that emits wavelength shift correction emission-line light; a spectrometer including a spectroscopic unit that receives respective rays of dispersed spectral light obtained by dispersing incident light in accordance with wavelength with a plurality of photoelectric conversion elements arranged in the direction of dispersion, and outputs the respective electrical signals corresponding to the respective light intensities of the respective rays of dispersed spectral light, and a temperature measuring unit that measures the temperature of the spectroscopic unit, the spectrometer being a spectrometer to be subjected to wavelength shift correction; and the wavelength shift correcting unit that determines a wavelength shift correction time emission-line wavelength corresponding to the wavelength shift correction emission-line light on the basis of respective electrical signals output from a plurality of specific photoelectric conversion elements that receive the wavelength shift correction emission-line light in the plurality of photoelectric conversion elements when the wavelength shift correction emission-line light is measured as the incident light with the spectrometer to be subjected to wavelength shift correction, and the temperature measured by the temperature measuring unit, and determines a wavelength variation from the difference between the determined wavelength shift correction time emission-line wavelength and the known emission-line wavelength of the wavelength shift correction emission-line light. In such a wavelength shift correction system, the wavelength shift correction light source may be independent of or be integrated with the spectrometer as the spectrometer to be subjected to wavelength shift correction. In the description below, a case where the wavelength shift correction light source is incorporated in the spectrometer as the spectrometer to be subjected to wavelength shift correction, and is integrated with the spectrometer will be explained first, followed by an explanation of a case where the wavelength shift correction light source is independent of the spectrometer. Further, in the description below, an embodiment in which the spectrometer includes the wavelength shift correcting unit will be explained. In other words, in the embodiment described below, a wavelength shift correction system is incorporated in a spectrometer as a spectrometer to be subjected to wavelength shift correction, for example.

Figure 1B:
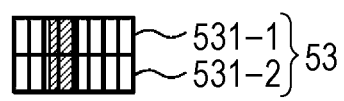
Figure 2:
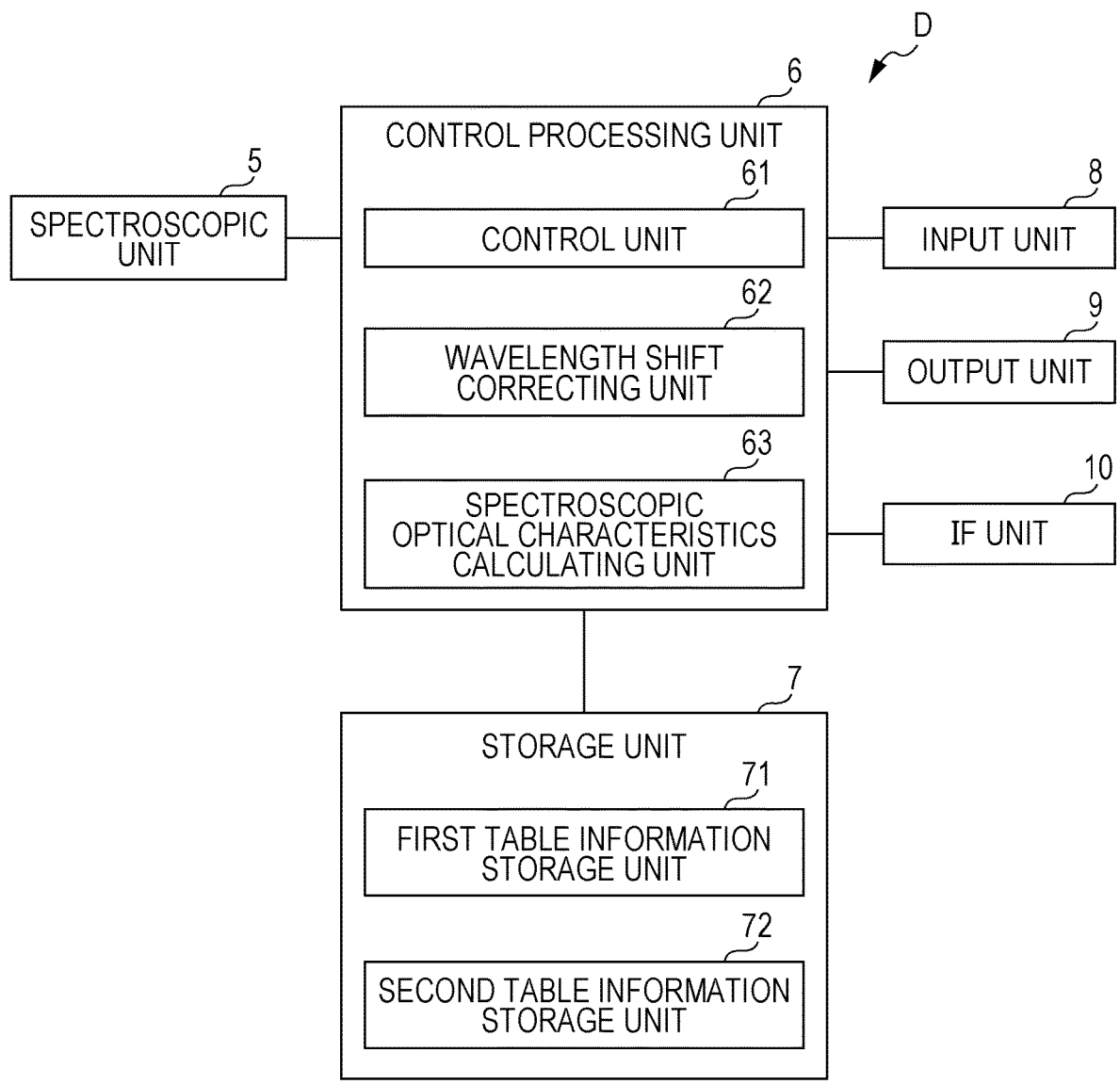
FIG. 2 is a block diagram showing the electrical configuration of the spectrometer.
Figure 3A:
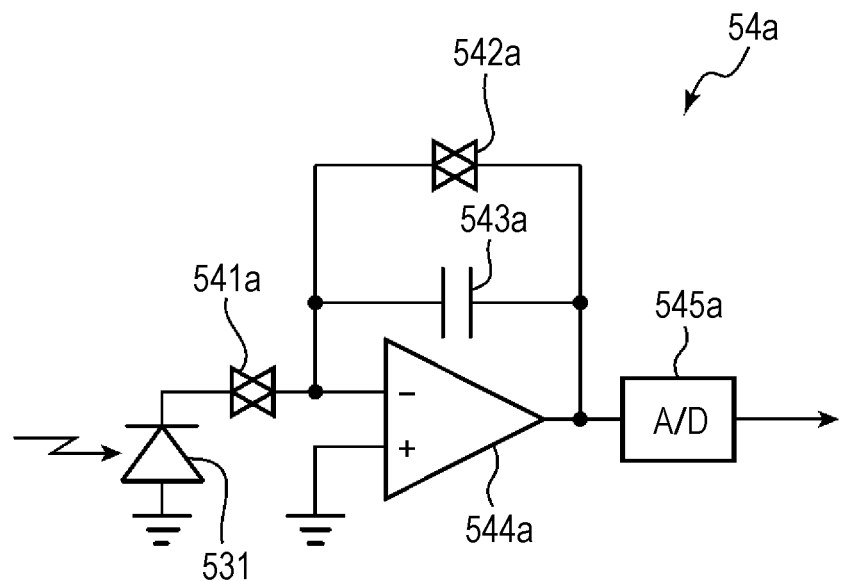
FIG. 3 is a circuit diagram showing the configuration of a preprocessing unit in the spectrometer.
Figure 3B:
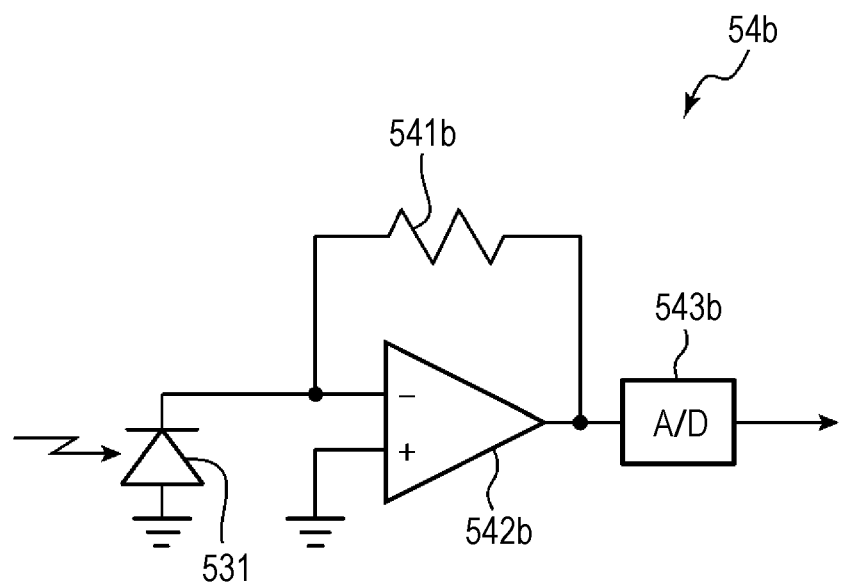

FIG. 1 is a schematic configuration diagram showing the optical configuration of a spectrometer incorporating a wavelength shift correction system according to an embodiment. FIG. 1A is a schematic diagram of the optical configuration of the spectrometer as viewed from a side. FIG. 1A is a schematic diagram of the light receiving unit of the spectrometer as viewed from above. FIG. 2 is a block diagram showing the electrical configuration of the spectrometer. FIG. 3 is a circuit diagram showing the configuration of a preprocessing unit in the spectrometer. FIG. 3A shows the preprocessing unit of a first mode. FIG. 3B shows the preprocessing unit of a second mode.

A spectrometer D according to the embodiment includes a wavelength shift correction system that performs wavelength shift correction at the stage of use, and is the spectrometer to be subjected to wavelength shift correction performed by the wavelength shift correction system. As shown in FIGS. 1 and 2, for example, the spectrometer D includes an emission-line light source 1, a measurement light source 2, an integrating sphere 3, a light guide member 4, a spectroscopic unit 5, a control processing unit 6, a storage unit 7, an input unit 8, an output unit 9, an interface unit (IF unit) 10, and a housing (not shown). The housing (not shown) is a box-like housing that houses the emission-line light source 1, the measurement light source 2, the integrating sphere 3, the light guide member 4, the spectroscopic unit 5, the control processing unit 6, the storage unit 7, the input unit 8, the output unit 9, and the IF unit 10.

The emission-line light source 1 is a device that is connected to the control processing unit 6, and, under the control of the control processing unit 6, emits emission-line light. In this embodiment, the emission-line light source (a wavelength shift correction light source) 1 is used for wavelength shift correction. The emission-line light source 1 includes a first light source that emits emission-line light, and a first light emission circuit (a first drive circuit) that drives and causes the first light source to emit light, for example.

Any light source can be used as the emission-line light source 1, as long as the light source emits emission-line light. The first light source used in the emission-line light source 1 is preferably a light source that emits emission-line light independent in terms of wavelength so that a single photoelectric conversion element in the later described light receiving unit 53 in the spectroscopic unit 5 does not receive a plurality of emission-line light rays, like a HgCd lamp, for example. However, the first light source in the emission-line light source 1 may be a light source that emits a plurality of emission-line light rays at narrow emission-line light intervals so that a single photoelectric conversion element in the light receiving unit 53 receives a plurality of emission-line light rays, like a neon lamp (Ne lamp), for example. In a case where such a light source that emits a plurality of emission-line light rays at narrow emission-line light intervals is used as the first light source, the emission-line light source 1 further includes a bandpass filter that transmits the wavelength shift correction emission-line light from among the emission-line light rays. In one example, the emission-line light source 1 includes a neon lamp, a first light emission circuit (a first drive circuit) that drives and causes the neon lamp to emit light, and a bandpass filter that transmits the wavelength shift correction emission-line light from among the emission-line light rays emitted from the neon lamp. The neon lamp is inexpensive and is small in size, and the first light emission circuit (the first drive circuit) can be easily formed. Thus, the costs can be lowered. In a case where a HgCd lamp is used, a bandpass filter that transmits the wavelength shift correction emission-line light from among emission-line light rays emitted from the HgCd lamp may also be further used.

The emission-line light source 1 is disposed at the integrating sphere 3 so that the light emitting surface for emitting the wavelength shift correction emission-line light faces the inside of the integrating sphere 3, and the wavelength shift correction emission-line light emitted from the emission-line light source 1 is emitted into the integrating sphere 3.

In this embodiment, the first light source used in the emission-line light source 1 is a Ne lamp.

The measurement light source 2 is a device that is connected to the control processing unit 6, emits white measurement light, and is used for measurement, under the control of the control processing unit 6. The measurement light source 2 includes a second light source that emits white light, and a second light emission circuit (a second drive circuit) that drives and causes the second light source to emit light, for example. A xenon lamp (Xe lamp) or the like is used as the measurement light source 2, for example. The measurement light source 2 is disposed at the integrating sphere 3 so that the light emitting surface for emitting measurement light faces the inside of the integrating sphere 3, and measurement light emitted from the measurement light source 2 is emitted into the integrating sphere 3.

The integrating sphere 3 is a member that has a diffuse reflector that diffusely reflects light, and more specifically, is a hollow sphere whose inner surface is covered with a material having a high diffuse reflectance. The material having a high diffuse reflectance may be magnesium oxide, aluminum oxide, barium sulfate, magnesium sulfate, zinc oxide, or the like, for example. A coating agent containing the material having a high diffuse reflectance is applied to the inner surface of the sphere, to form the diffuse reflector. A measurement aperture having a circular shape, for example, is formed through the integrating sphere 3. A first light receiving aperture having a circular shape, for example, is formed through a portion at a position in the normal direction of the measurement aperture plane in the measurement aperture. A second light receiving aperture having a circular shape, for example, is formed through a portion at a predetermined position. At the time of color measurement, the measurement object SP is brought to the measurement aperture, and the measurement object SP faces the measurement aperture.

The light guide member 4 is a member that guides predetermined light from the integrating sphere 3 to the spectroscopic unit 5, and includes an optical fiber, for example. In this embodiment, the light guide member 4 includes a first optical fiber 4-1 that guides light reflected from the measurement object SP as one ray of the predetermined light from the integrating sphere 3 to the spectroscopic unit 5, and a second optical fiber 4-2 that guides reference light as another ray of the predetermined light from the integrating sphere 3 to the spectroscopic unit 5.

One end of the first optical fiber 4-1 is connected to the first light receiving aperture of the integrating sphere 3, and the other end is connected to the spectroscopic unit 5 so that the reflected light enters the later described incident slit aperture in the spectroscopic unit 5. One end of the second optical fiber 4-2 is connected to the second light receiving aperture of the integrating sphere 3, and the other end is connected to the spectroscopic unit 5 so that the reference light enters the later described incident slit aperture in the spectroscopic unit 5.

In such a configuration, at the time of measurement, the measurement object SP is brought to the measurement aperture of the integrating sphere 3, and measurement light is emitted from the measurement light source 2 under the control of the control processing unit 6, as described above. The measurement light emitted from the measurement light source 2 is diffusely reflected by the inner surface of the integrating sphere 3, part of the diffusely reflected measurement light is guided by the second optical fiber 4-2 via the second light receiving aperture of the integrating sphere 3 and, as the reference light, is made to enter the spectroscopic unit 5, and the other part of the diffusely reflected measurement light illuminates the measurement object SP facing the measurement aperture of the integrating sphere 3. The reflected light of the measurement light reflected by the measurement object SP is guided by the first optical fiber 4-1 via the first light receiving aperture of the integrating sphere 3, and is made to enter the spectroscopic unit 5. Here, in the integrating sphere 3, a second baffle 31-2 is provided between the measurement light source 2 facing the inside of the integrating sphere 3 and the first light receiving aperture, so that the measurement light emitted from the measurement light source 2 directly reaches (directly arrives at) neither of the first and second light receiving apertures. In wavelength shift correction, on the other hand, a white panel is brought to the measurement aperture of the integrating sphere 3, and wavelength shift correction emission-line light is emitted from the emission-line light source 1 under the control of the control processing unit 6. This wavelength shift correction emission-line light emitted from the emission-line light source 1 is diffusely reflected by the inner surface of the integrating sphere 3, part of the diffusely reflected wavelength shift correction emission-line light is guided by the first optical fiber 4-1 via the first light receiving aperture of the integrating sphere 3 and is made to enter the spectroscopic unit 5, and the other part of the diffusely reflected wavelength shift correction emission-line light is guided by the second optical fiber 4-2 via the second light receiving aperture of the integrating sphere 3 and, as the reference light, is made to enter the spectroscopic unit 5. Here, in the integrating sphere 3, a first baffle 31-1 is provided between the emission-line light source 1 facing the inside of the integrating sphere 3 and the second light receiving aperture, so that the wavelength shift correction emission-line light emitted from the emission-line light source 1 directly reaches (directly arrives at) neither of the first and second light receiving apertures. Note that, in the wavelength shift correction, the diffusely reflected wavelength shift correction emission-line light guided by one of the first and second optical fibers 4-1 and 4-2 may be used.

The spectroscopic unit 5 is a device that is connected to the control processing unit 6. Under the control of the control processing unit 6, the spectroscopic unit 5 receives, with a plurality of photoelectric conversion elements arranged in the direction of dispersion, respective rays of dispersed spectral light obtained by dispersing incident light in accordance with wavelengths, and outputs respective electrical signals corresponding to the respective light intensities of the respective rays of dispersed spectral light. In this embodiment, the spectroscopic unit 5 measures and outputs the temperature of the spectroscopic unit 5. More specifically, the spectroscopic unit 5 includes an incident slit panel 51, a reflective concave diffraction grating 52, a light receiving unit 53, a preprocessing unit 54, and a temperature measuring unit 55, for example.

The incident slit panel 51 is a plate-like member in which an incident slit aperture that is a through-hole is formed. The incident slit aperture has a rectangular shape (a slit-like shape) that is long in one direction and is short in the other direction orthogonal to the one direction. The incident light is made to enter the spectroscopic unit 5 through the incident slit aperture, and is made to enter the reflective concave diffraction grating 52 while maintaining a slit-like shape.

The reflective concave diffraction grating 52 is an optical element that disperses, through diffraction, the incident light entering in the slit-like shape from the incident slit aperture in accordance with the wavelength. Each ray of the spectral light dispersed in accordance with the wavelength by the reflective concave diffraction grating 52 is reflected by the reflective concave diffraction grating 52, and is made to enter the light receiving unit 53.

The light receiving unit 53 is a circuit that is connected to the control processing unit 6, includes a plurality of photoelectric conversion elements 531 that correspond to the respective rays of dispersed spectral light and are arranged in the direction of dispersion, and photoelectrically converts the respective rays of dispersed spectral light with the respective photoelectric conversion elements 531, under the control of the control processing unit 6. Each of the photoelectric conversion elements 531 in the light receiving unit 53 is connected to the preprocessing unit 54, and each output of the photoelectric conversion elements 531 in the light receiving unit 53 is input to the preprocessing unit 54. The photoelectric conversion elements 531 each includes a silicon photodiode (SPD), and the light receiving unit 53 includes an SPD linear array sensor, for example. Further, in this embodiment, the reflected light (the wavelength shift correction emission-line light) and the reference light are made to enter the spectroscopic unit 5, as described above. Therefore, to cope with the reflected light (the wavelength shift correction emission-line light) and the reference light, the light receiving unit 53 includes a first sub light receiving unit 531-1 including a plurality of photoelectric conversion elements 531 that receive the respective rays of dispersed spectral light of the reflected light (the wavelength shift correction emission-line light), and a second sub light receiving unit 531-2 including a plurality of photoelectric conversion elements 531 that receive the respective rays of dispersed spectral light of the reference light, as shown in FIG. 1B. These first and second sub light receiving units 531-1 and 531-2 are arranged in two parallel rows in a direction orthogonal to the direction of dispersion.

The preprocessing unit 54 is a circuit that is connected to the light receiving unit 53, and outputs respective electrical signals corresponding to the respective light intensities of the respective rays of dispersed spectral light, on the basis of the respective outputs of the respective photoelectric conversion elements 531 of the light receiving unit 53. The preprocessing unit 54 is connected to the control processing unit 6, and outputs the respective electrical signals corresponding to the respective light intensities of the respective rays of dispersed spectral light to the control processing unit 6. Such a preprocessing unit 54 includes a charge storage circuit 54a of the first mode provided for each of the photoelectric conversion elements 531 in the light receiving unit 53, for example. Alternatively, the preprocessing unit 54 includes an I-V conversion circuit 54b of the second mode provided for each of the photoelectric conversion elements 531 in the light receiving unit 53, for example.

As shown in FIG. 3A, the charge storage circuit 54a includes first and second switches 541a and 542a, a capacitor 543a, an operational amplifier 544a, and an analog-digital conversion circuit (an A/D conversion circuit) 545a, for example. One end of the first switch 541a is connected to one end (the anode terminal) of the photoelectric conversion element 531, and the other end of the first switch 541a is connected to the inverting input terminal (−) of the operational amplifier 544a. The other end (the cathode terminal) of the photoelectric conversion element 531 is grounded. The second switch 542a and the capacitor 543a are connected in parallel between the inverting input terminal (−) and the output terminal of the operational amplifier 544a. The non-inverting input terminal (+) of the operational amplifier 544a is grounded, and the input end of the A/D conversion circuit 545a is connected to the output terminal of the operational amplifier 544a. The output end of the A/D conversion circuit 545a is connected to the control processing unit 6. In such a charge storage circuit 54a, at a time of measurement or wavelength shift correction, the first switch 541a is turned on, and the second switch 542a is turned off. As a result, the electric charge generated through photoelectric conversion by the photoelectric conversion elements 531 is stored in the capacitor 543a, an output voltage $V=(1/C)\times \int i(t)dt$ is output from the operational amplifier 544a to the A/D conversion circuit 545a, analog-to-digital signal conversion is performed by the A/D conversion circuit 545a, and the digital signal is output to the control processing unit 6. Here, C represents the capacitance of the capacitor 543a, and the integral $\int$ is integrated with the charge storage time. The output voltage V as the digital signal corresponds to an example of an electrical signal corresponding to the light intensity of dispersed spectral light. When one output is completed, the first switch 541a is turned off, and the second switch 542a is turned on, so that the electric charge stored in the capacitor 543a is discharged, and the capacitor 543a is reset. FIG. 3A shows one charge storage circuit 54a, and the charge storage circuit 54a shown in FIG. 3A is provided in each of the photoelectric conversion elements 531 in the light receiving unit 53.

On the other hand, as shown in FIG. 3B, the I-V conversion circuit 54b includes a resistance element 541b, an operational amplifier 542b, and an analog-digital conversion circuit (an A/D conversion circuit) 543ba, for example. The inverting input terminal (−) of the operational amplifier 542b is connected to one end (the anode terminal) of the photoelectric conversion element 531. The other end (the cathode terminal) of the photoelectric conversion element 531 is grounded. The resistance element 541b is connected between the inverting input terminal (−) and the output terminal of the operational amplifier 542b. The non-inverting input terminal (+) of the operational amplifier 542b is grounded, and the input end of the A/D conversion circuit 543b is connected to the output terminal of the operational amplifier 542b. The output end of the A/D conversion circuit 543b is connected to the control processing unit 6. In such an I-V conversion circuit 54b, the electric charge generated through photoelectric conversion by the photoelectric conversion element 531 flows as a current i to the resistance element 541b, and an output voltage $V=i\times R$ is output from the operational amplifier 542b to the A/D conversion circuit 543b, is converted from an analog signal into a digital signal by the A/D conversion circuit 543b, and is output to the control processing unit 6. Here, R represents the resistance value of the resistance element 541b. The output voltage V as the digital signal corresponds to another example of an electrical signal corresponding to the light intensity of dispersed spectral light. FIG. 3B shows one I-V conversion circuit 54b, and the I-V conversion circuit 54b shown in FIG. 3B is provided in each of the photoelectric conversion elements 531 in the light receiving unit 53.

The temperature measuring unit 55 is a device that is disposed in the light receiving unit 53, or in the preprocessing unit 54, or around (in the vicinity of) the light receiving unit 53 and the preprocessing unit 54, is connected to the control processing unit 6, and measures the temperature of the spectroscopic unit 5. The temperature measuring unit 55 outputs the measured temperature to the control processing unit 6. The temperature measuring unit 55 includes a thermistor and a temperature sensor IC, for example.

The input unit 8 is a device that is connected to the control processing unit 6, and inputs, to the spectrometer D, various commands such as a command for issuing a wavelength shift correction start instruction and a command for issuing a measurement start instruction, and various kinds of data necessary for performing the wavelength shift correction and the measurement, such as the name of the measurement object SP. For example, the input unit 8 is formed with a plurality of input switches or the like to which predetermined functions are assigned. The output unit 9 is a device that is connected to the control processing unit 6, and, under the control of the control processing unit 6, outputs commands and data input from the input unit 8, and results of measurement or the like conducted by the spectrometer D. For example, the output unit 9 is a display device such as a CRT display, a liquid crystal display (LCD), or an organic EL display, or a printing device such as a printer.

Note that a touch panel may be formed with the input unit 8 and the output unit 9. In the case of configuring this touch panel, the input unit 8 is a position input device that detects and inputs an operation position such as a resistive film method or a capacitance method, and the output unit 9 is a display device. In this touch panel, the position input device is disposed on the display surface of the display device, and one or a plurality of input content candidates that can be input is displayed on the display device. When the user touches the display position at which the input content the user wishes to input is displayed, the position is detected by the position input device, and the display content displayed at the detected position is input as the input content of the user operation to the spectrometer D. In such a touch panel, the user can easily understand an input operation intuitively, and thus, the spectrometer D, which is easy for the user to handle, is provided.

The IF unit 10 is a circuit that is connected to the control processing unit 6, and, under the control of the control processing unit 6, inputs/outputs data to/from an external device. For example, the IF unit 10 is an interface circuit of RS-232C, which is a serial communication method, an interface circuit using the Bluetooth (registered trademark) standard, an interface circuit that performs infrared communication compliant with the IrDA (Infrared Data Association) standard, an interface circuit using the USB (universal serial bus) standard, or the like. Alternatively, the IF unit 10 may be a circuit that performs communication with an external device. For example, the IF unit 10 may be a data communication card, a com interface circuit compliant with the IEEE 802.11 standard, or the like.

The storage unit 7 is a circuit that is connected to the control processing unit 6, and, under the control of the control processing unit 6, stores various kinds of predetermined programs and various kinds of predetermined data. The various kinds of predetermined programs include, for example, control processing programs, such as a control program for controlling the respective components 1, 2, 5, and 7 through 10 of the spectrometer D, a wavelength shift correction program for determining a wavelength variation on the basis of an output of the spectroscopic unit 5 in a case where wavelength shift correction light is emitted from the emission-line light source 1, a spectroscopic optical characteristics calculation program for determining spectroscopic optical characteristics such as spectral reflectance, spectral transmittance, and spectral radiance, for example, on the basis of an output of the spectroscopic unit 5 in a case where measurement light is emitted from the measurement light source 2. The various kinds of predetermined data include data necessary for executing these programs, such as the name of the measurement object SP, and first and second table information to be used for determining the wavelength of the emission-line light whose wavelength has been shifted in the device. Such a storage unit 7 includes a read only memory (ROM) that is a nonvolatile storage element, an electrically erasable programmable read only memory (EEPROM) that is a rewritable nonvolatile storage element, or the like, for example. The storage unit 7 includes a random access memory (RAM) that serves as a so-called working memory for the control processing unit 6 that stores data generated during execution of the predetermined programs. The storage unit 7 functionally includes first and second table information storage units 71 and 72 that store the first and second table information.

The first table information is information that is in a table format, and indicates the correspondence relationship between the wavelength and the ratio of a sensitivity gain product that is a multiplication result obtained by multiplying the gain ratio of the spectroscopic unit 5 corresponding to the plurality of specific photoelectric conversion elements 531 determined from a first temperature as the reference temperature at the time of predetermined initial calibration by the spectral sensitivity ratio of the plurality of specific photoelectric conversion elements 531, for each of the wavelengths at predetermined wavelength intervals in a predetermined wavelength range including the emission-line wavelengths of the wavelength shift correction emission-line light. An example of that is shown in FIG. 10 described later.

The second table information is information that is in a table format, and indicates, for each of temperatures at predetermined temperature intervals in a predetermined temperature range including the reference temperature, the temperature correspondence relationship between a second temperature and the ratio of a predetermined second output ratio based on the respective electrical signals that are output from the plurality of specific photoelectric conversion elements 531 in a case where the wavelength shift correction emission-line light is measured as the incident light with the spectrometer to be subjected to wavelength shift correction at the second temperature, to a predetermined first output ratio as the reference ratio based on the respective electrical signals that are output from the plurality of specific photoelectric conversion elements 531 in a case where the wavelength shift correction emission-line light is measured with the spectrometer D serving as the spectrometer to be subjected to wavelength shift correction at the reference temperature at the time of the initial calibration. An example of that is shown in FIG. 11 described later. These first and second table information will be described later in detail.

The control processing unit 6 is a circuit for controlling each of the components 1, 2, 5, and 7 through 10 of the spectrometer D in accordance with the functions of these respective components, calculating the wavelength variation, and obtaining the spectroscopic optical characteristics of the measurement object SP. The control processing unit 6 includes a central processing unit (CPU) and its peripheral circuits, for example. As the control processing programs are executed, the control processing unit 6 functionally includes a control unit 61, a wavelength shift correcting unit 62, and a spectroscopic optical characteristics calculating unit 63.

The control unit 61 controls the respective components 1, 2, 5, and 7 through 10 of the spectrometer D in accordance with the functions of these respective components, and also controls the entire spectrometer D.

The wavelength shift correcting unit 62 determines a wavelength variation on the basis of the output of the spectroscopic unit 5 obtained in a case where wavelength shift correction light is emitted from the emission-line light source 1. More specifically, in a case where wavelength shift correction emission-line light is measured as incident light with the spectrometer D serving as the spectrometer to be subjected to wavelength shift correction, the wavelength shift correcting unit 62 determines the wavelength shift correction time emission-line wavelength $\Lambda 1$ corresponding to the wavelength shift correction emission-line light, on the basis of respective electrical signals that are output from a plurality of specific photoelectric conversion elements 531 that receive the wavelength shift correction emission-line light in the plurality of photoelectric conversion elements 531, and the temperature measured with the temperature measuring unit 55. The wavelength shift correcting unit 62 then determines a wavelength variation $\delta\Lambda$ from the difference between the determined wavelength shift correction time emission-line wavelength $\Lambda 1$ and the known emission-line wavelength $\Lambda 0$ of the wavelength shift correction emission-line light. In this embodiment, the wavelength shift correcting unit 62 determines, from a second table stored in the second table information storage unit 72, the ratio of the second output ratio to the first output ratio corresponding to the temperature measured by the temperature measuring unit 55, and determines, from a first table stored in the first table information storage unit 71, the wavelength shift correction time emission-line wavelength $\Lambda 1$ corresponding to the determined ratio of the second output ratio to the first output ratio, and the respective electrical signals that are output from the plurality of specific photoelectric conversion elements 531 in a case where the wavelength shift correction emission-line light is measured with the spectrometer D serving as the spectrometer to be subjected to wavelength shift correction. In this embodiment, the wavelength shift correcting unit 62 then performs wavelength shift correction on the spectrometer D, on the basis of the determined wavelength variation $\delta A$. Alternatively, the wavelength shift correcting unit 62 warns that wavelength shift correction is necessary, on the basis of the determined wavelength variation $\delta A$. The wavelength shift correction will be described later in detail.

The spectroscopic optical characteristics calculating unit 63 determines predetermined spectroscopic optical characteristics such as spectral reflectance, spectral transmittance, and spectral radiance, for example, by a known calculation technique, on the basis of the electrical signals that have been output from the spectroscopic unit 5 and correspond to the respective light intensities of the respective rays of dispersed spectral light. The spectroscopic optical characteristics calculating unit 63 outputs the determined spectroscopic optical characteristics to the output unit 9, and, if necessary, to the IF unit 10.

Figure 4:
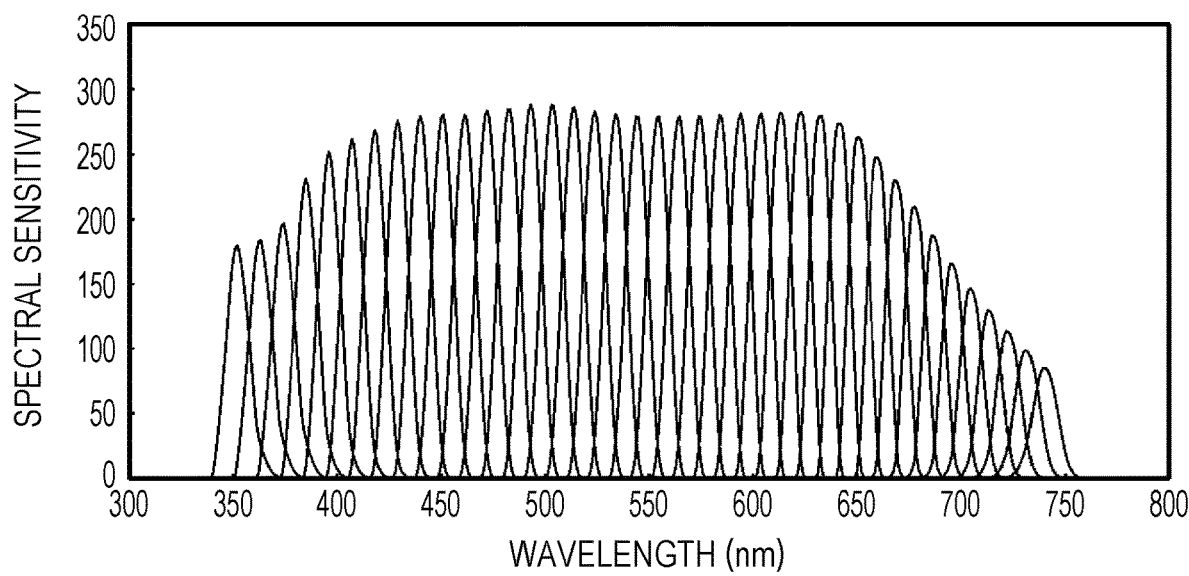
FIG. 4 is a graph showing an example of the spectral sensitivity of a light receiving unit in the spectrometer.
Figure 5:
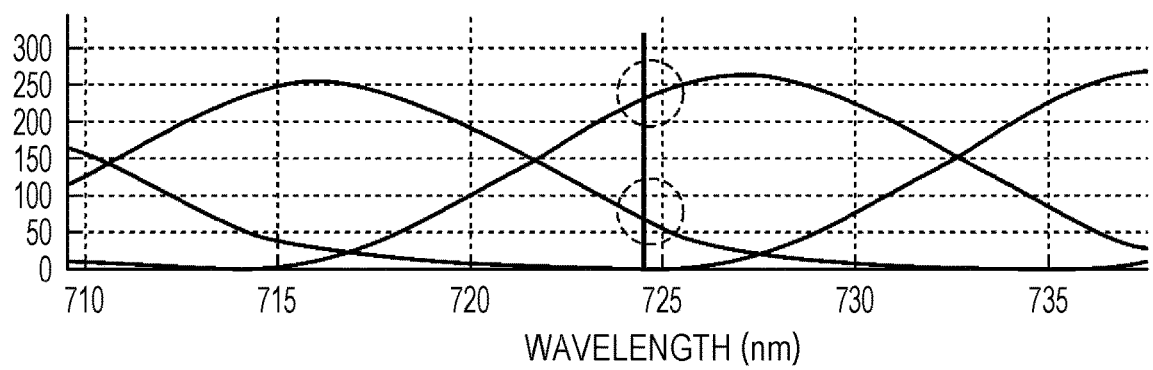
FIG. 5 is a graph for explaining the relationship between the spectral sensitivity of the light receiving unit and wavelength shift correction emission-line light emitted from an emission-line light source.
Figure 6A:
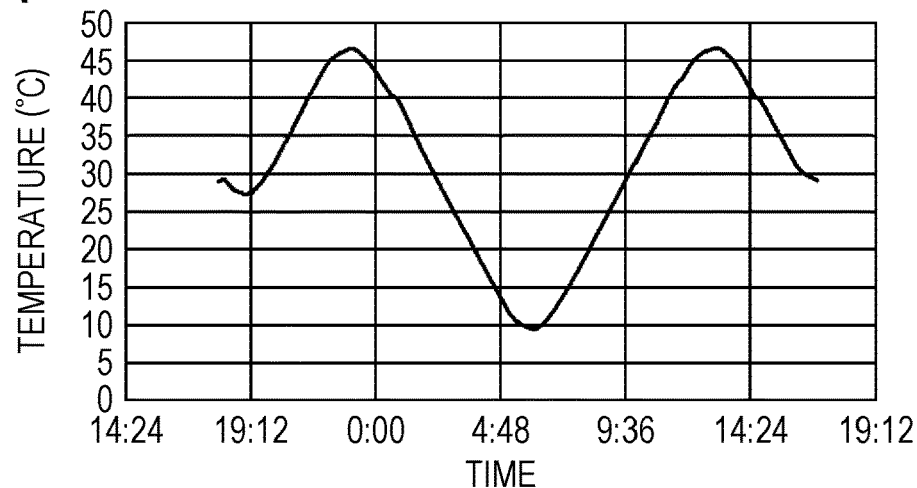
FIG. 6 is a graph for explaining the relationship between temperature and wavelength estimation results.
Figure 6B:
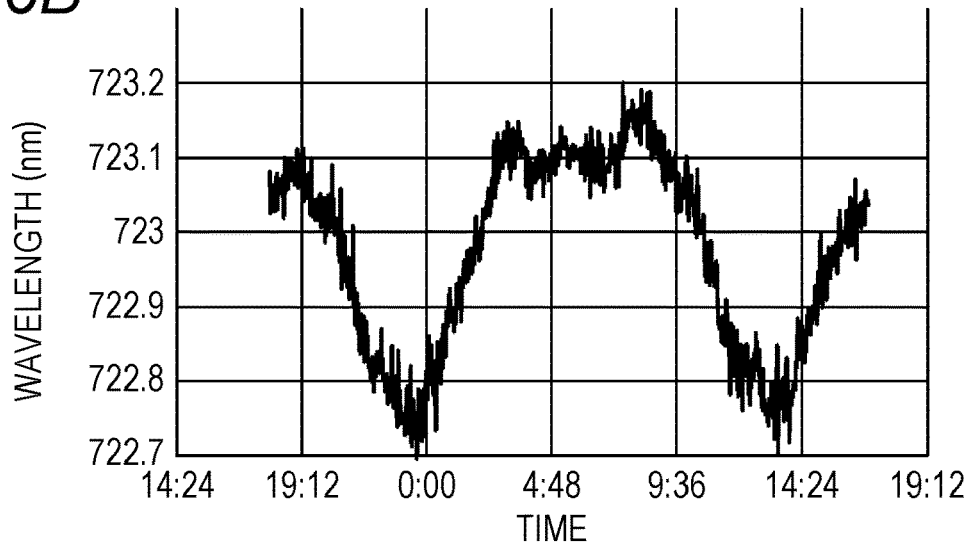
Figure 6C:
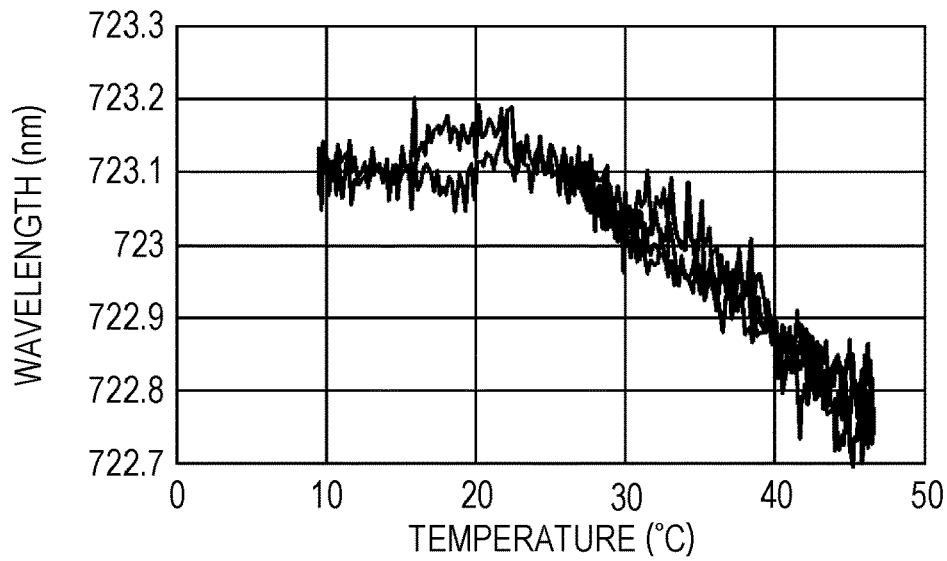
Figure 7:
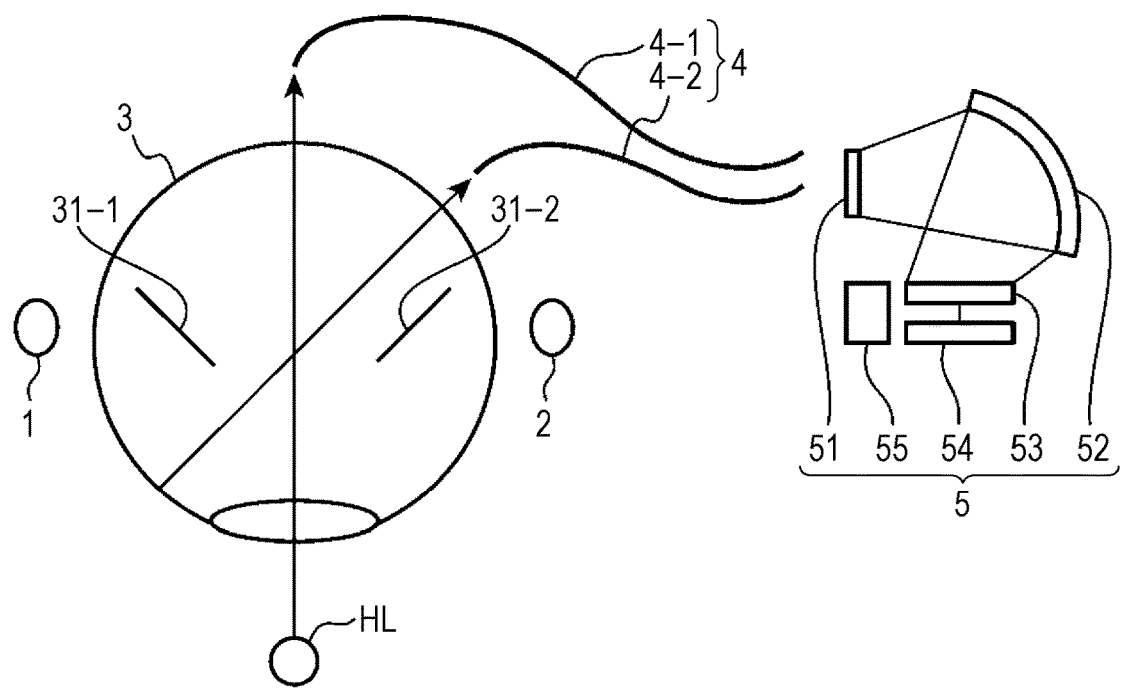
FIG. 7 is a diagram for explaining how to determine a gain ratio in the spectrometer.
Figure 8:
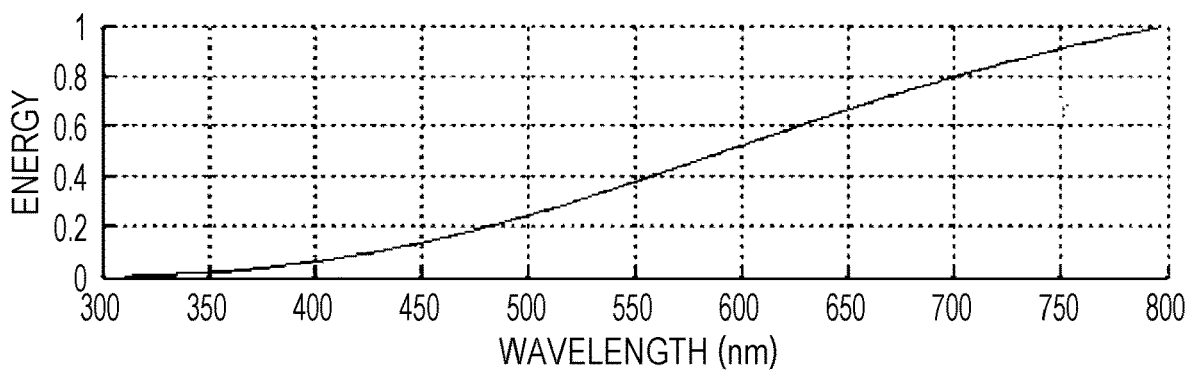
FIG. 8 is a graph showing the spectral radiance of a halogen lamp in a case where temperature is 2871 K.
Figure 9A:
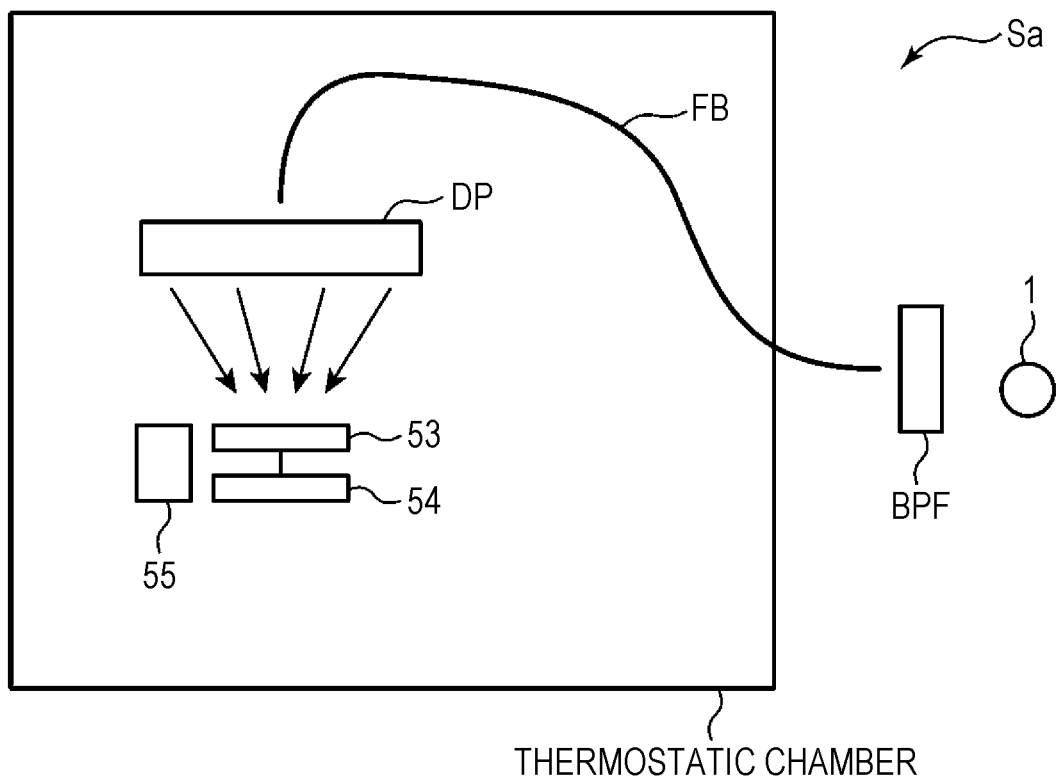
FIG. 9 is a diagram for explaining how to determine the temperature correspondence relationship between a second output ratio and wavelength with respect to a first output ratio (a reference output ratio) in the spectroscopic unit.
Figure 9B:
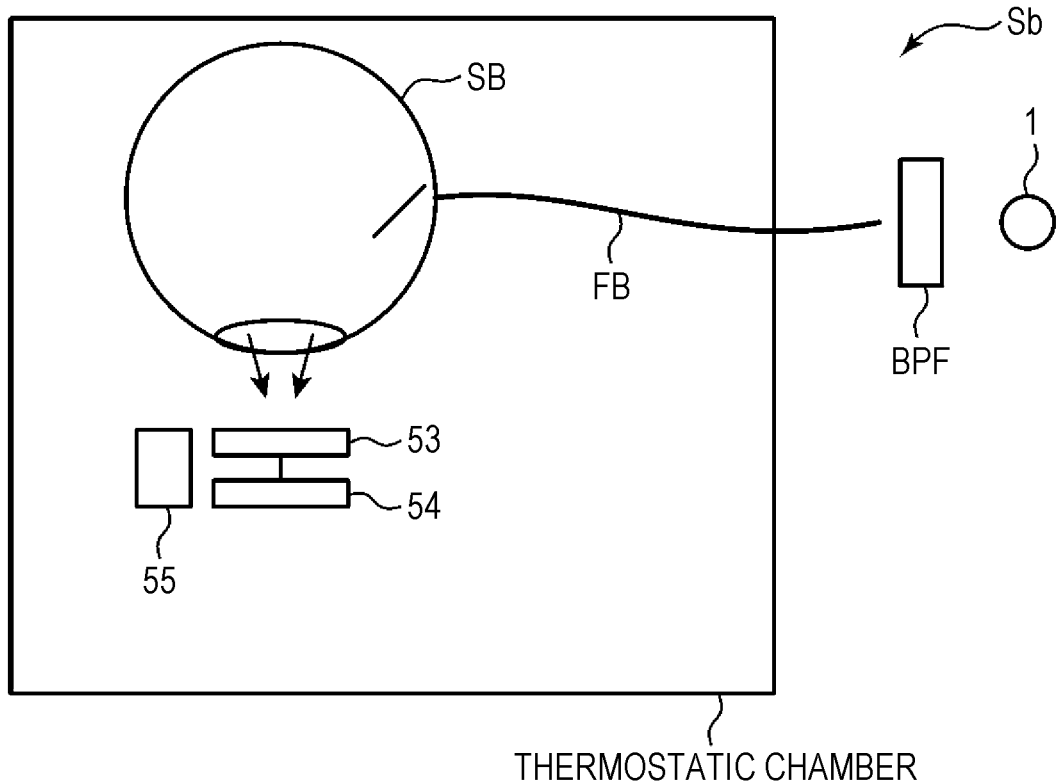

Next, wavelength shift correction is described. FIG. 4 is a graph showing an example of the spectral sensitivity of the light receiving unit in the spectrometer. The abscissa axis in FIG. 4 indicates wavelength expressed in nanometers (nm), and the ordinate axis indicates sensitivity (spectral sensitivity). FIG. 5 is a graph for explaining the relationship between the spectral sensitivity of the light receiving unit and the wavelength shift correction emission-line light emitted from the emission-line light source. The abscissa axis in FIG. 5 indicates wavelength expressed in nm, and the ordinate axis indicates the sensitivity (spectral sensitivity) to the spectral sensitivity, and the light intensity to the emission-line light. FIG. 6 is a graph for explaining the relationship between temperature and wavelength estimation results. FIG. 6A shows the relationship between elapsed time and temperature change. The abscissa axis indicates time (elapsed time), and the ordinate axis indicates temperature in degrees Celsius. FIG. 6B shows the results of emission-line wavelength calculation in a case where temperature changed as shown in FIG. 6A. The abscissa axis indicates time (elapsed time), and the ordinate axis indicates wavelength expressed in nm. FIG. 6C shows the relationship between temperature and results of emission-line wavelength calculation (wavelength estimation results), which is obtained from the relationship shown in FIG. 6A and the calculation results shown in FIG. 6B. In FIG. 6C, the abscissa axis indicates temperature expressed in degrees Celsius, and the ordinate axis indicates wavelength expressed in nm. FIG. 7 is a diagram for explaining how to determine a gain ratio in the spectrometer. FIG. 8 is a graph showing the spectral radiance of a halogen lamp in a case where temperature is 2871 K. The abscissa axis in FIG. 8 indicates wavelength expressed in nm, and the ordinate axis indicates energy. FIG. 9 is a diagram for explaining how to determine the temperature correspondence relationship between the second output ratio and wavelength with respect to the first output ratio (the reference output ratio) in the spectroscopic unit. FIG. 9A shows a case where a diffuser panel is used to generate uniform wavelength shift correction emission-line light. FIG. 9B shows a case where an integrating sphere is used to generate uniform wavelength shift correction emission-line light. FIG. 10 is a diagram showing the first table stored in the spectrometer. FIG. 11 is a diagram showing the second table stored in the spectrometer.

With the spectrometer D having such a configuration, the spectrum cannot be measured correctly simply after assembling is completed. For example, at the factory or the like during manufacture or before shipment, it is necessary to assign wavelength (center wavelengths) to the respective photoelectric conversion elements 531 in the light receiving unit 53, and adjusts the signal levels to be output from the respective photoelectric conversion elements 531. Such an initial calibration method is disclosed in JP 2017-032293 A and the like, for example.

By this calibration method disclosed in JP 2017-032293 A, primary calibration is performed on each of first individuals that are individual spectroscopic devices 1000. In the primary calibration, measurement light 1020 for the primary calibration containing an emission-line component is measured by the first individuals. Measurement light 1020 for secondary calibration is measured by each of the first individuals, and spectral characteristics are output.

The plurality of pieces of output spectral characteristics is averaged, so that average spectral characteristics are determined. Secondary calibration is performed on second individuals that are the individual spectroscopic devices 1000. In the secondary calibration, the measurement light 1020 for the secondary calibration is measured by the second individuals, and the output spectral characteristics are made closer to the average spectral characteristics. In both the primary calibration and the secondary calibration, calibration parameters that determine the spectral sensitivity of a sensor 1031 are adjusted. Note that the reference numerals given to the respective components in this paragraph are those used in JP 2017-032293 A.

With attention being paid to one photoelectric conversion element 531 among the photoelectric conversion elements 531 in the light receiving unit 53 after such calibration is performed, the wavelength of the light received by the subject photoelectric conversion element 531 is obvious from the wavelength (the center wavelength) assigned to the subject photoelectric conversion element 531, and the intensity of the light received by the subject photoelectric conversion element 531 is obvious from the signal output from the subject photoelectric conversion element 531. Accordingly, it is possible to measure the respective wavelengths and the respective light intensities, which are the spectrum, on the basis of the respective signals output from the respective photoelectric conversion elements 531 in the light receiving unit 53.

After such initial calibration is performed, the spectrometer D is used. After time has elapsed, shifts (wavelength shifts) from the wavelengths (the center wavelengths) assigned in the initial calibration occur in the respective photoelectric conversion elements 531 in the light receiving unit 53, due to aging or the like, for example. For this reason, after the initial calibration is performed, it is necessary to perform wavelength shift correction on the spectrometer D as needed.

Therefore, in a case where one emission-line light ray is received by a plurality of photoelectric conversion elements (specific photoelectric conversion elements) 531 in the light receiving unit 53, wavelength shift correction is performed on the spectrometer D, on the basis of the output ratios of the respective outputs from the plurality of photoelectric conversion elements 531. For example, in a case where the light receiving unit 53 in the spectroscopic unit 5 has the spectral sensitivity shown in FIG. 4, wavelength shift correction emission-line light at an emission-line wavelength is received by two specific photoelectric conversion elements 531 in the light receiving unit 53, as shown in FIG. 5. When the wavelength shifts occur due to the aging or the like, the output ratios in the two specific photoelectric conversion elements 531 also change with the amount of the wavelength shift (a wavelength shift amount, or a wavelength variation). Therefore, a table showing the correspondence relationship between the output ratio and the wavelength in these two specific photoelectric conversion elements 531 for each predetermined wavelength interval in a predetermined wavelength range including emission-line wavelengths is prepared beforehand, so that the emission-line wavelength at the time of wavelength shift correction is determined from the output ratios in these two specific photoelectric conversion elements 531 at the time of wavelength shift correction, and thus, the wavelength shift amount is obtained.

More specifically, a case where some or all of the circuits in a stage before the control processing unit 6 that performs signal processing in wavelength shift correction have no temperature characteristics is discussed first. Each of the photoelectric conversion elements 531 in the light receiving unit 53 is referred to as a "channel", and channel numbers i are sequentially assigned, starting from the photoelectric conversion element 531 that receives the shortest-wavelength light to the photoelectric conversion element 531 that receives the longest-wavelength light. In the example illustrating in FIG. 4, the number of the photoelectric conversion elements 531 in the light receiving unit 53 is 40. In this case, the channel numbers i are integer values from 1 to 40. The channel (a photoelectric conversion element 531) with a channel number i is represented by Ch(i). The spectral sensitivity of the channel Ch(i) is represented by Res(Ch(i), $\lambda$) ($\lambda$ representing the wavelength). The gain of the preprocessing unit 54 that performs preprocessing on an output of the channel Ch(i) (the gain of the charge storage circuit 54a shown in FIG. 3A, or the gain in the I-V conversion circuit 54b shown in FIG. 3B) is represented by G(Ch(i)). An electrical signal of the channel Ch(i) output from the spectroscopic unit 5 (a digital signal output from the A/D conversion circuit 545a of the charge storage circuit 54a shown in FIG. 3A, or a digital signal output from the A/D conversion circuit 543b of the I-V conversion circuit 54b shown in FIG. 3B) is represented by Count(Ch(i)). The emission-line wavelength of the wavelength shift correction emission-line light is represented by $\lambda_0$, and its light intensity is represented by A. In such a case, the electrical signal $\text{Count}_0(Ch(i))$ of the channel Ch(i) is expressed by the equation (1) shown below. The electrical signal $\text{Count}_0(Ch(i+1))$ of the channel Ch(i+1) adjacent directly to the channel Ch(i) is expressed by the equation (2) shown below. The output ratio $(=\text{Count}_0(Ch(i+1))/\text{Count}_0(Ch(i)))$ of the electrical signal $\text{Count}_0(Ch(i+1))$ of the channel Ch(i+1) to the electrical signal $\text{Count}_0(Ch(i))$ of the channel Ch(i) is expressed by the equation (3) shown below.

[Mathematical Formula 1]

$$\text{Count}_0(Ch(i)) = G(Ch(i)) \cdot A \cdot Res(Ch(i), \lambda_0) \tag{1}$$

[Mathematical Formula 2]

$$\text{Count}_0(Ch(i+1)) = G(Ch(i+1)) \cdot A \cdot Res(Ch(i+1), \lambda_0) \tag{2}$$

[Mathematical Formula 3]

$$\frac{\text{Count}_0(Ch(i+1))}{\text{Count}_0(Ch(i))} = \frac{G(Ch(i+1)) \cdot Res(Ch(i+1), \lambda_0)}{G(Ch(i)) \cdot Res(Ch(i), \lambda_0)} \tag{3}$$

It is possible to obtain the gain ratio G(Ch(i+1))/G(Ch(i)) in the equation (3) by using a white light source whose spectral radiance $L_{Halogen}(\lambda)$ is known, such as a halogen lamp, for example. In other words, in a case where a halogen lamp is measured, the electrical signal $\text{Count}_1(Ch(i))$ of the channel Ch(i) is expressed by the equation (4) shown below, and the electrical signal $\text{Count}_1(Ch(i+1))$ of the channel Ch(i+1) is expressed by the equation (5) shown below. According to these equations, the gain ratio G(Ch(i+1))/G(Ch(i)) in the equation (3) is expressed by the equation (6) shown below.

[Mathematical Formula 4]

$$\text{Count}_1(Ch(i)) = G(Ch(i)) \cdot \int Res(Ch(i), \lambda) \cdot L_{Halogen}(\lambda) d\lambda \tag{4}$$

-continued

[Mathematical Formula 5]

$$\text{Count}_1(Ch(i+1)) = G(Ch(i+1)) \cdot \int Res(Ch(i+1), \lambda) \cdot L_{Halogen}(\lambda) d\lambda \quad (5)$$

[Mathematical Formula 6]

$$\frac{G(Ch(i+1))}{G(Ch(i))} = \frac{\text{Count}_1(Ch(i+1))}{\text{Count}_1(Ch(i))} \cdot \frac{\int Res(Ch(i), \lambda) \cdot L_{Halogen}(\lambda) d\lambda}{\int Res(Ch(i+1), \lambda) \cdot L_{Halogen}(\lambda) d\lambda} \quad (6)$$

Therefore, to perform wavelength shift correction by using the equation (3), the spectral sensitivity $Res(Ch(i), \lambda)$ of the spectroscopic unit 5 is first measured with a monochromator at the factory or the like during manufacture or before shipment or the like, for example. A halogen lamp HL whose spectral radiance $L_{Halogen}(\lambda)$ is known is then measured with a spectrometer D serving as the spectrometer to be subjected to wavelength shift correction, as shown in FIG. 7. As a result, the electrical signal $\text{Count}_1(Ch(i))$ of the channel $Ch(i)$ and the electrical signal $\text{Count}_1(Ch(i+1))$ of the channel $Ch(i+1)$ are actually measured, and the gain ratio $G(Ch(i+1))/G(Ch(i))$ is determined according to the equation (6). Note that the spectral radiance $L_{Halogen}(\lambda)$ of the halogen lamp HL is shown in FIG. 8. After the spectral sensitivity $Res(Ch(i), \lambda)$ and the gain ratio $G(Ch(i+1))/G(Ch(i))$ of the spectroscopic unit 5 are determined, a table that indicates the correspondence relationship between the output ratio $\text{Count}_0(Ch(i+1))/\text{Count}_0(Ch(i))$ and the wavelength, for each of wavelengths at predetermined wavelength intervals (intervals of 1 nm, for example) in a predetermined wavelength range including the emission-line wavelength $\lambda_0$ of the wavelength shift correction emission-line light, is created, and is stored into the storage unit 7. By referring to this table, it is possible to determine the emission-line wavelength $\Lambda$ of the wavelength shift correction emission-line light satisfying the equation (3), from the output ratio $\text{Count}_0(Ch(i+1))/\text{Count}_0(Ch(i))$ in a case where the wavelength shift correction emission-line light is emitted from the emission-line light source 1.

The emission-line wavelength determined from the output ratio $\text{Count}_0(Ch(i+1))/\text{Count}_0(Ch(i))$ at the time of the initial wavelength measurement by referring to the table, or the emission-line wavelength $\lambda_0$ inherent to the wavelength shift correction emission-line light is set as the known emission-line wavelength $\Lambda 0$ of the wavelength shift correction emission-line light, and the emission-line wavelength determined from the output ratio $\text{Count}_0(Ch(i+1))/\text{Count}_0(Ch(i))$ at the time of wavelength shift correction by referring to the table is set as the wavelength shift correction time emission-line wavelength $\Lambda 1$ corresponding to the wavelength shift correction emission-line light. In that case, the wavelength variation (the wavelength shift amount) $\delta\Lambda$ ($=\Lambda 1-\Lambda 0$) is determined from the difference, and the wavelengths of the spectral sensitivities $Res(Ch(i), \lambda)$ of the respective channels $Ch(i)$ are corrected uniformly by the wavelength variation $\delta\Lambda$. In this manner, wavelength shift correction is performed.

Meanwhile, although it has been assumed that there are no temperature characteristics in the above description, the circuits in the stages before the control processing unit 6 that performs signal processing in wavelength shift correction include elements having temperature characteristics, such as the photoelectric conversion elements 531, the capacitors 543a, and the resistance elements 541b, for example. Therefore, some or all of the circuits in the stages before the control processing unit 6 that performs signal processing in wavelength shift correction have temperature characteristics. In one experimental example, the spectrometer D is housed in a thermostatic chamber, and temperature changes are periodically caused in the light receiving unit 53 and the preprocessing unit 54. In this case, the light receiving unit 53 and the preprocessing unit 54 change in temperature as shown in FIG. 6A. If the wavelength shift correction time emission-line wavelength $\Lambda 1$ corresponding to the wavelength shift correction emission-line light is determined by the above method in this case, the wavelength shift correction time emission-line wavelength $\Lambda 1$ corresponding to the wavelength shift correction emission-line light change like the temperature change shown in FIG. 6A, as shown in FIG. 6B. The wavelength shift correction time emission-line wavelength $\Lambda 1$ corresponding to the wavelength shift correction emission-line light changes with changes in temperature, as shown in FIG. 6C. Therefore, in a case where some or all of the circuits in the stages before the control processing unit 6 that performs signal processing in wavelength shift correction have temperature characteristics, it is possible to ignore the temperature characteristics when the temperature at the time of initial calibration is equal to the temperature at the time of wavelength shift correction, but it is necessary to compensate for the temperature characteristics when the temperature at the time of initial calibration is not equal to the temperature at the time of wavelength shift correction.

Therefore, in this embodiment, where the temperature characteristics of outputs of the photoelectric conversion elements 531 in the light receiving unit 53 are also included in the temperature characteristics of an output of the preprocessing unit 54, which is where the variations caused by the temperature characteristics in some or all of the circuits in the stages before the control processing unit 6 that performs signal processing in wavelength shift correction are included in a gain G, the above equation (3) can be expressed by the equation (7) shown below.

[Mathematical Formula 7]

$$\frac{\text{Count}_0(Ch(i+1), Temp)}{\text{Count}_0(Ch(i), Temp)} = \frac{G(Ch(i+1), Temp) \cdot Res(Ch(i+1), \lambda_0)}{G(Ch(i), Temp) \cdot Res(Ch(i), \lambda_0)} \quad (7)$$

Here, $\text{Count}_0(Ch(i), Temp)$ represents the electrical signal of the channel $Ch(i)$ at a temperature Temp, $\text{Count}_0(Ch(i+1), Temp)$ represents the electrical signal of the channel $Ch(i+1)$ at the temperature Temp, $G(Ch(i), Temp)$ represents the gain of the preprocessing unit 54 that performs preprocessing on the output of the channel $Ch(i)$ at the temperature Temp, and $G(Ch(i+1), Temp)$ represents the gain of the preprocessing unit 54 that performs preprocessing on the output of the channel $Ch(i+1)$ at the temperature Temp.

Therefore, with the temperature characteristics being taken into consideration, at the temperature (reference temperature) $Temp_0$ at the time of initial calibration, the electrical signal $\text{Count}_2(Ch(i), Temp_0)$ of the channel $Ch(i)$ is expressed by the equation (8) shown below, and the electrical signal $\text{Count}_2(Ch(i+1), Temp_0)$ of the channel $Ch(i+1)$ adjacent directly to the channel $Ch(i)$ is expressed by the equation (9) shown below.

[Mathematical Formula 8]

$$\text{Count}_2(Ch(i), Temp_0) = G(Ch(i), Temp_0) \cdot A \cdot Res(Ch(i), \lambda) \quad (8)$$

[Mathematical Formula 9]

$$Count_2(Ch(i+1), Temp_0) = G(Ch(i+1), Temp_0) \cdot A \cdot Res(Ch(i+1), \lambda) \quad (9)$$

Meanwhile, at a temperature $Temp_1$ different from the reference temperature $Temp_0$ at the time of initial calibration, the electrical signal $Count_2(Ch(i), Temp_1)$ of the channel $Ch(i)$ is expressed by the equation (10) shown below, and the electrical signal $Count_2(Ch(i+1), Temp_1)$ of the channel $Ch(i+1)$ adjacent directly to the channel $Ch(i)$ is expressed by the equation (11) shown below.

[Mathematical Formula 10]

$$Count_2(Ch(i), Temp_1) = G(Ch)i), Temp_1) \cdot A \cdot Res(Ch(i), \lambda) \quad (10)$$

[Mathematical Formula 11]

$$Count_2(Ch(i+1), Temp_1) = G(Ch(i+1), Temp_1) \cdot A \cdot Res(Ch(i+1), \lambda) \quad (11)$$

The light intensity A and the spectral sensitivities $Res(Ch(i), \lambda)$ and $Res(Ch(i+1), \lambda)$ of the wavelength shift correction emission-line light are eliminated from these equations (8) through (11), to obtain the equation (12) shown below. The ratio ($Temp_1$) in this equation (12) is expressed by the equation (13) shown below, which represents the ratio (here, ($Count_2(Ch(i+1), Temp_1)/Count_2(Ch(i), Temp_1))/(Count_2(Ch(i+1), Temp_0)/Count_2(Ch(i), Temp_0)) = (Count_2(Ch(i+1), Temp_1)/Count_2(Ch(i), Temp_1)) \times (Count_2(Ch(i), Temp_0)/Count_2(Ch(i+1), Temp_0))$ of the predetermined second output ratio (here, $Count_2(Ch(i+1), Temp_1)/Count_2(Ch(i), Temp_1)$) based on the respective electrical signals (here, $Count_2(Ch(i), Temp_1)$ and $Count_2(Ch(i+1), Temp_1)$) that are output from a plurality of specific photoelectric conversion elements ($Ch(i)$ and $Ch(i+1)$ in the equations (11) and (12)) in a case where the wavelength shift correction emission-line light is measured as the incident light at a second temperature $Temp_1$ with the spectrometer D serving as the spectrometer to be subjected to wavelength shift correction, relative to the predetermined first output ratio (here, $Count_2(Ch(i+1), Temp_0)/Count_2(Ch(i), Temp_0)$) as the reference ratio based on the respective electrical signals (here, $Count_2(Ch(i), Temp_0)$ and $Count_2(Ch(i+1), Temp_0)$) that are output from the plurality of specific photoelectric conversion elements that receive the wavelength shift correction emission-line light in a case where the wavelength shift correction emission-line light is measured as the incident light at the reference temperature $Temp_0$ at the time of initial calibration with the spectrometer D serving as the spectrometer to be subjected to wavelength shift correction.

As a result, the above equation (7) is transformed into the equation (14) shown below.

[Mathematical Formula 12]

$$\frac{G(Ch(i+1), Temp_1)}{G(Ch(i), Temp_1)} = \text{ratio}(Temp_1) \cdot \frac{G(Ch(i+1), Temp_0)}{G(Ch(i), Temp_0)} \quad (12)$$

[Mathematical Formula 13]

$$\text{ratio}(Temp_1) = \frac{Count_2(Ch(i+1), Temp_1)}{Count_2(Ch(i), Temp_1)} \cdot \frac{Count_2(Ch(i), Temp_0)}{Count_2(Ch(i+1), Temp_0)} \quad (13)$$

-continued

[Mathematical Formula 14]

$$\frac{Count_0(Ch(i+1), Temp)}{Count_0(Ch(i), Temp)} = \text{ratio}(Temp) \cdot \frac{G(Ch(i+1), Temp_0) \cdot Res(Ch(i+1), \lambda_0)}{G(Ch(i), Temp_0) \cdot Res(Ch(i), \lambda_0)} \quad (14)$$

Therefore, to perform wavelength shift correction with the temperature characteristics being taken into consideration, the spectral sensitivity $Res(Ch(i), \lambda)$ of the spectroscopic unit 5 is first measured with a monochromator in the initial calibration at the factory or the like during manufacture or before shipment or the like, for example. A halogen lamp HL whose spectral radiance $L_{Halogen}(\lambda)$ is known is then measured at the reference temperature $Temp_0$ with a spectrometer D serving as the spectrometer to be subjected to wavelength shift correction, as shown in FIG. 7. As a result, the electrical signal $Count_1(Ch(i), Temp_0)$ of the channel $Ch(i)$ at the reference temperature $Temp_0$ and the electrical signal $Count_1(Ch(i+1), Temp_0)$ of the channel $Ch(i+1)$ at the reference temperature $Temp_0$ are actually measured, and the gain ratio $G(Ch(i+1), Temp_0)/G(Ch(i), Temp_0)$ at the reference temperature $Temp_0$ is determined according to the equation (6).

Next, ratio(Temp) is determined while the temperature Temp is changed at predetermined temperature intervals. As a result, that second table TT that shows, for each of the temperatures at the predetermined temperature intervals (such as intervals of five degrees Celsius or 10 degrees Celsius, for example) in a predetermined temperature range including the reference temperature $Temp_0$, the temperature correspondence relationship between the ratio of the predetermined second output ratio to the predetermined first output ratio and the second temperature Temp is created as shown in FIG. 11, for example. Second table information indicating the second table TT created in this manner is stored into the second table information storage unit 72.

More specifically, as shown in FIGS. 9A and 9B, the light receiving unit 53, the preprocessing unit 54, and the temperature measuring unit 55 in the spectroscopic unit 5 are accommodated in a thermostatic chamber so that the respective outputs can be read from the outside. The wavelength shift correction emission-line light is extracted from the emission-line light source 1 via a bandpass filter BPF, and this wavelength shift correction emission-line light is guided into the thermostatic chamber by an optical fiber FB, and is made to enter a diffuser panel DP as shown in FIG. 9A or an integrating sphere SB as shown in FIG. 9B through the optical fiber FB. Thus, the wavelength shift correction emission-line light that is uniformly diffused light enters the light receiving unit 53. In such a state, while the output of the temperature measuring unit 55 is being referred to, and the temperature Temp is being changed in the thermostatic chamber, the respective electrical signals $Count_2(Ch(i), Temp)$ and $Count_2(Ch(i+1), Temp)$ output from the channels $Ch(i)$ and $Ch(i+1)$ are read, and ratio(Temp) at the temperature Temp is determined from the Equation (13). As a result, the temperature correspondence relationship between the temperature Temp and the ratio (=the ratio between ratio (Temp) and the count ratio) of the predetermined second output ratio to the predetermined first output ratio. Thus, the second table is created by scanning the temperature Temp.

Note that, in the above description, the light receiving unit 53, the preprocessing unit 54, and the temperature measuring unit 55 are accommodated in a thermostatic chamber, as shown in FIG. 9. However, the entire spectrometer D may be accommodated in a thermostatic chamber, and ratio(Temp) may be determined while the temperature Temp is changed at predetermined temperature intervals.

Next, at the reference temperature $Temp_0$ of the initial calibration, the output ratio (count ratio) $Count_0(Ch(i+1))/Count_0(Ch(i))$ is determined while the wavelength $\lambda$ is changed at predetermined wavelength intervals (for example, at 1-nm intervals). For example, a monochromator that emits monochromatic light is used as the spectrometer D serving as the spectrometer to be subjected to wavelength shift correction, and the spectral sensitivity of each channel of the sensor is determined. The gain G can also be determined with the use of a Halogen lamp. As a result, according to the equation (3), the first table LT that shows, for each of the wavelengths at the predetermined wavelength intervals (for example, at 1-nm intervals) in a predetermined wavelength range including the emission-line wavelength $\lambda_0$ of the wavelength shift correction emission-line light, the wavelength correspondence relationship between the wavelength and the ratio of the sensitivity gain product that is a result of multiplying the gain ratio $G(Ch(i+1), Temp_0)/G(Ch(i), Temp_0)$ of the spectroscopic unit 5 corresponding to the plurality of specific photoelectric conversion elements 531 (Ch(i) and Ch(i+1)) determined at the first temperature $Temp_0$ as the reference temperature at the time of the predetermined initial calibration by the spectral sensitivity ratio $Res(Ch(i+1), \lambda)/Res(Ch(i), \lambda)$ of the plurality of specific photoelectric conversion elements 531 (Ch(i) and Ch(i+1)) is created as shown in FIG. 10, for example. First table information indicating the first table LT created in this manner is stored into the first table information storage unit 71.

In the initial wavelength measurement, at the reference temperature $Temp_0$, a white panel is brought to the measurement aperture of the integrating sphere 3, and the wavelength shift correction emission-line light is emitted from the emission-line light source 1 under the control of the control processing unit 6. The electrical signal $Count_0(Ch(i+1))$ of the channel Ch(i) and the electrical signal $Count_0(Ch(i))$ of the channel Ch(i+1), which are output from the spectroscopic unit 5, are then acquired. From the first table LT stored in the first table information storage unit 71, the wavelength corresponding to the output ratio (count ratio) $Count_0(Ch(i+1))/Count_0(Ch(i))$ of these acquired electrical signals is determined by the wavelength shift correcting unit 62 of the control processing unit 6, and is stored as the known emission-line wavelength $\Lambda0$ of the wavelength shift correction emission-line light into the storage unit 7.

In wavelength shift correction, on the other hand, a white panel is brought to the measurement aperture of the integrating sphere 3, the wavelength shift correction emission-line light is emitted from the emission-line light source 1 under the control of the control processing unit 6, the temperature Temp that is measured by the temperature measuring unit 55 and is output from the spectroscopic unit 5 is acquired, and the electrical signal $Count_0(Ch(i+1))$ of the channel Ch(i) and the electrical signal $Count_0(Ch(i))$ of the channel Ch(i+1) are acquired. From the second table TT stored in the second table information storage unit 72, ratio(Temp) corresponding to the temperature Temp acquired from the temperature measuring unit 55, which is the ratio of the predetermined second output ratio to the predetermined first output ratio, is determined by the wavelength shift correcting unit 62 of the control processing unit 6. The output ratio (count ratio) $Count_0(Ch(i+1))/Count_0(Ch(i))$ of the acquired respective electrical signals is then divided by the determined ratio(Temp) by the wavelength shift correcting unit 62. From the first table LT stored in the first table information storage unit 71, the wavelength corresponding to the division result $(Count_0(Ch(i+1))/Count_0(Ch(i)))/ratio(Temp)$ is determined as the wavelength shift correction time emission-line wavelength $\Lambda1$ corresponding to the wavelength shift correction emission-line light by the wavelength shift correcting unit 62. The wavelength variation (wavelength shift amount) $\delta\Lambda$ $(=\Lambda1-\Lambda0)$ is then determined by the wavelength shift correcting unit 62 from the difference between the determined wavelength shift correction time emission-line wavelength $\Lambda1$ and the known emission-line wavelength $\Lambda0$ of the wavelength shift correction emission-line light. The wavelength of the spectral sensitivity $Res(Ch(i), \lambda)$ of each channel Ch(i) is corrected uniformly by the wavelength variation $\delta\Lambda$. Thus, wavelength shift correction is performed.

Note that, in the above description, the known emission-line wavelength $\Lambda0$ of the wavelength shift correction emission-line light is the emission-line wavelength at the time of initial wavelength measurement in the wavelength shift correction emission-line light, as determined in the initial wavelength measurement. However, the known emission-line wavelength $\Lambda0$ may be the inherent emission-line wavelength in the wavelength shift correction emission-line light. Further, in this embodiment, the wavelength calculation table information includes the correspondence relationship at wavelength intervals of 1 nm. Accordingly, the known emission-line wavelength $\Lambda0$ of the wavelength shift correction emission-line light and the wavelength shift correction time emission-line wavelength $\Lambda1$ may be determined on the subnanometer order, for example, through linear interpolation or the like.

At a time of measurement, the measurement object SP is brought to the measurement aperture of the integrating sphere 3, and measurement light is emitted from the measurement light source 2 under the control of the control processing unit 6. The spectroscopic optical characteristics calculating unit 63 of the control processing unit 6 determines predetermined spectroscopic optical characteristics such as spectral reflectance, for example, by a known calculation technique, on the basis of the respective electrical signals that have been output from the spectroscopic unit 5 and correspond to the respective light intensities of the respective rays of dispersed spectral light. At this stage, the wavelength of the spectral sensitivity $Res(Ch(i), \lambda)$ of each channel Ch(i) is uniformly corrected by the wavelength variation $\delta\Lambda$.

As described above, the spectrometer D in this embodiment is automatically subjected to wavelength shift correction before use, and then measures spectroscopic optical characteristics.

Alternatively, in a case where the wavelength shift correcting unit 62 compares the wavelength variation $\delta\Lambda$ with a predetermined threshold that is appropriately set in advance, and the result of the comparison shows that the wavelength variation $\delta\Lambda$ exceeds the predetermined threshold, the spectrometer D may output, from the output unit 9, a warning to the effect that wavelength shift correction is necessary. In this manner, it is possible to make the user recognize the necessity of wavelength shift correction.

As described above, with the wavelength shift correction system and the wavelength shift correction method incorporated in the spectrometer D in this embodiment, the temperature of the spectroscopic unit 5 is measured with the temperature measuring unit 55, and the wavelength shift correction time emission-line wavelength $\Lambda1$ corresponding to the wavelength shift correction emission-line light is determined on the basis of the measured temperature. Thus, even in a case where the temperature $Temp_0$ at the time of calibration (initial calibration) during manufacture or before shipping is different from the temperature Temp at a time of wavelength shift correction, for example, it is possible to reduce deterioration of the accuracy of wavelength shift correction.

In the wavelength shift correction system and the wavelength shift correction method, the first and second tables TL and TT are stored beforehand into the first and second table information storage units 71 and 72, so that the wavelength shift correction time emission-line wavelength Λ1 can be easily determined with the use of the first and second tables TL and TT.

Note that, although the emission-line light source 1 is included in the spectrometer D serving as the spectrometer to be subjected to wavelength shift correction in the above embodiment, the emission-line light source 1 may be a structure independent of the spectrometer D serving as the spectrometer to be subjected to wavelength shift correction.

Figure 12:
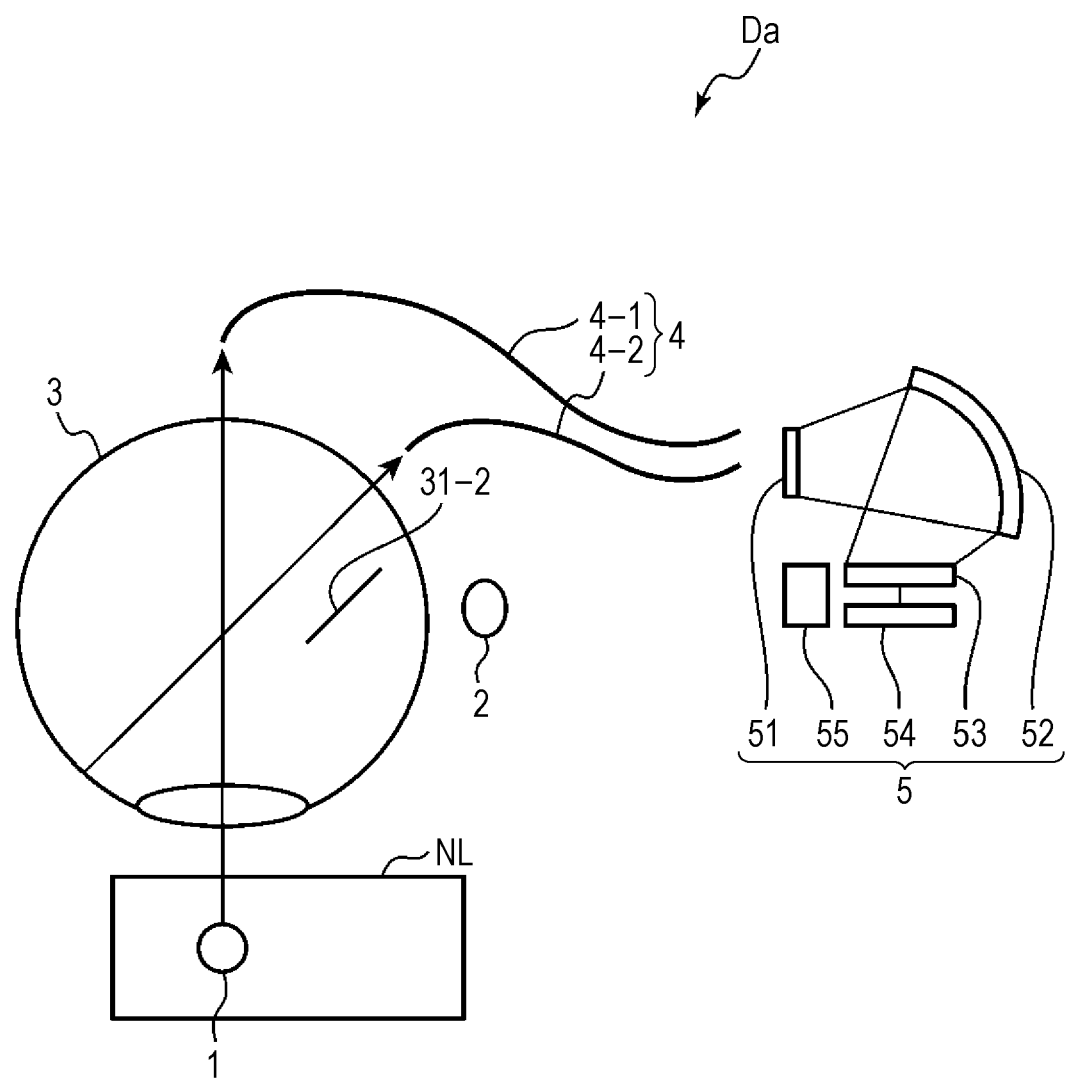
FIG. 12 is a diagram showing a modification of the wavelength shift correction system and the spectrometer.

FIG. 12 is a diagram showing a modification of the wavelength shift correction system and the spectrometer. As shown in FIG. 12, the wavelength shift correction system of the modification includes a wavelength shift correction light source unit NL and a spectrometer Da of the modification. The spectrometer Da of this modification includes a measurement light source 2, an integrating sphere 3, a light guide member 4, a spectroscopic unit 5, a control processing unit 6, a storage unit 7, an input unit 8, an output unit 9, an IF unit 10, and a housing (not shown) that houses these components. The measurement light source 2, the integrating sphere 3, the light guide member 4, the spectroscopic unit 5, the control processing unit 6, the storage unit 7, the input unit 8, the output unit 9, the IF unit 10, and the housing (not shown) in spectrometer Da of this modification are the same as the measurement light source 2, the integrating sphere 3, the light guide member 4, the spectroscopic unit 5, the control processing unit 6, the storage unit 7, the input unit 8, the output unit 9, the IF unit 10, and the housing (not shown) in the spectrometer D of the embodiment described above, respectively, and therefore, explanation thereof is not made herein.

Meanwhile, the wavelength shift correction light source unit NL is a device that emits wavelength shift correction emission-line light, and includes the same device as the emission-line light source 1 in the spectrometer D of the embodiment described above. For example, the wavelength shift correction light source unit NL includes a HgCd lamp, and a light emission circuit (a drive circuit) or the like that drives and causes the HgCd lamp to emit light. Note that the wavelength shift correction light source unit NL may further include a bandpass filter that transmits the wavelength shift correction emission-line light from among emission lines emitted from a Ne lamp.

In the wavelength shift correction system of such a modification, at a time of wavelength shift correction, the wavelength shift correction light source unit NL is brought to the measurement aperture of the integrating sphere 3 in the spectrometer Da, the Ne lamp is turned on, and the wavelength shift correction is performed in the same manner as described above.

In the wavelength shift correction system and the wavelength shift correction method as described above, the wavelength shift correction light source unit NL is independent of the spectrometer Da serving as the spectrometer to be subjected to wavelength shift correction. Accordingly, the spectrometer Da can be made smaller in size. Furthermore, the wavelength shift correction light source unit NL is only required to be prepared at a time of wavelength shift correction as needed, and is not necessarily always prepared.

Further, in the embodiment described above, the plurality of specific photoelectric conversion elements are the two of the first and second photoelectric conversion elements Ch(i) and Ch(i+1) arranged adjacent to each other. However, the plurality of specific photoelectric conversion elements are not necessarily those two, as long as wavelength shift correction emission-line light is received by a plurality of photoelectric conversion elements. For example, the plurality of specific photoelectric conversion elements that receive the wavelength shift correction emission-line light may be the two of first and second photoelectric conversion elements arranged adjacent to each other via one or more photoelectric conversion elements. Alternatively, the plurality of specific photoelectric conversion elements may be three or more photoelectric conversion elements, for example. In such a case, the wavelength shift correction emission-line light is a plurality of rays having different emission-line wavelengths from one another. The wavelength shift correcting unit 62 determines a plurality of wavelength variations corresponding to the respective rays of wavelength shift correction emission-line light, and lastly determines a wavelength variation from a representative value such as an average value or a median value on the basis of the plurality of wavelength variations determined as above. The wavelength shift correcting unit 62 then performs wavelength shift correction on the spectrometer to be subjected to wavelength shift correction. Further, the first table information storage unit 71 may store beforehand a plurality of tables corresponding to the respective rays of the wavelength shift correction emission-line light. From the second table TT stored in the second table information storage unit 72, for each of the rays of wavelength shift correction emission-line light, the wavelength shift correcting unit 62 may determine the ratio of the second output ratio to the first output ratio corresponding to a temperature Temp measured with the temperature measuring unit 55. From the first table LT stored in the first table information storage unit 71, the wavelength shift correcting unit 62 may determine the wavelength shift correction time emission-line wavelength Λ1 corresponding to the determined ratio of the second output ratio to the first output ratio, and each electrical signal output from the plurality of specific photoelectric conversion elements corresponding to the wavelength shift correction emission-line light in a case where the wavelength shift correction emission-line light is measured as incident light with the spectrometer D serving as the spectrometer to be subjected to wavelength shift correction. From the difference between the determined wavelength shift correction time emission-line wavelength Λ1 and the known emission-line wavelength Λ0 of the wavelength shift correction emission-line light, the wavelength shift correcting unit 62 may determine the wavelength variation δΛ. On the basis of a plurality of wavelength variations δΛ determined for the respective rays of wavelength shift correction emission-line light, the wavelength shift correcting unit 62 may determine a representative value such as an average value or a median value to be the ultimate wavelength variation δΛ, and perform wavelength shift correction on the spectrometer D serving as the spectrometer to be subjected to wavelength shift correction.

The present specification discloses various modes of technologies as described above, and the principal technologies are summarized below.

A wavelength shift correction system according to one mode includes: a wavelength shift correction light source that emits wavelength shift correction emission-line light; a spectrometer including a spectroscopic unit that receives respective rays of dispersed spectral light obtained by dispersing incident light in accordance with wavelength with a plurality of photoelectric conversion elements arranged in the direction of dispersion, and outputs the respective electrical signals corresponding to the respective light intensities of the respective rays of dispersed spectral light, and a temperature measuring unit that measures the temperature of the spectroscopic unit, the spectrometer being a spectrometer to be subjected to wavelength shift correction; and a wavelength shift correcting unit that determines a wavelength shift correction time emission-line wavelength corresponding to the wavelength shift correction emission-line light on the basis of respective electrical signals output from a plurality of specific photoelectric conversion elements that receive the wavelength shift correction emission-line light in the plurality of photoelectric conversion elements when the wavelength shift correction emission-line light is measured as the incident light with the spectrometer to be subjected to wavelength shift correction, and the temperature measured by the temperature measuring unit, and determines a wavelength variation from the difference between the determined wavelength shift correction time emission-line wavelength and the known emission-line wavelength of the wavelength shift correction emission-line light. In the above wavelength shift correction system, the spectrometer preferably includes the wavelength shift correcting unit. In the above wavelength shift correction system, the plurality of specific photoelectric conversion elements is preferably the two of first and second photoelectric conversion elements arranged adjacent to each other. In the above wavelength shift correction system, the plurality of specific photoelectric conversion elements is preferably the two of first and second photoelectric conversion elements arranged adjacent to each other via one of more photoelectric conversion elements. In the above wavelength shift correction system, the plurality of specific photoelectric conversion elements is preferably three or more photoelectric conversion elements, the wavelength shift correction emission-line light preferably includes a plurality of rays having different emission-line wavelengths from one another, and the wavelength shift correcting unit preferably determines a plurality of wavelength variations corresponding to the respective rays of the wavelength shift correction emission-line light, and lastly determines a wavelength variation from a representative value such as an average value or a median value on the basis of the plurality of the determined wavelength variations. In the above wavelength shift correction system, the known emission-line wavelength of the wavelength shift correction emission-line light is preferably the emission-line wavelength at the time of the initial wavelength measurement in the wavelength shift correction emission-line light, the emission-line wavelength being measured in the initial wavelength measurement conducted during manufacture or before shipment, for example. In the above wavelength shift correction system, the known emission-line wavelength of the wavelength shift correction emission-line light is preferably an intrinsic emission line wavelength in the wavelength shift correction emission-line light.

Such a wavelength shift correction system measures the temperature of the spectroscopic unit with the temperature measuring unit, and determines the wavelength shift correction time emission-line wavelength corresponding to the wavelength shift correction emission-line light, on the basis of the measured temperature. Thus, even in a case where the temperature at the time of calibration (initial calibration) during manufacture or before shipping is different from the temperature at a time of wavelength shift correction, for example, it is possible to reduce deterioration of the accuracy of wavelength shift correction.

In another mode, the above wavelength shift correction system further includes: a first table information storage unit that stores a first table that shows, for each of wavelengths at predetermined wavelength intervals in a predetermined wavelength range including the emission-line wavelength of the wavelength shift correction emission-line light, the wavelength correspondence relationship between wavelength and the ratio of a sensitivity gain product that is a multiplication result obtained by multiplying the gain ratio of the spectroscopic unit corresponding to the plurality of specific photoelectric conversion elements determined at a first temperature as the reference temperature at the time of predetermined initial calibration by the spectral sensitivity ratio of the plurality of specific photoelectric conversion elements; and a second table information storage unit that stores a second table that shows, for each of temperatures at predetermined temperature intervals in a predetermined temperature range including the reference temperature, the temperature correspondence relationship between a second temperature and the ratio of a predetermined second output ratio based on the respective electrical signals that are output from the plurality of specific photoelectric conversion elements in a case where the wavelength shift correction emission-line light is measured as the incident light at the second temperature with the spectrometer to be subjected to wavelength shift correction, to a predetermined first output ratio as a reference ratio based on the respective electrical signals that are output from the plurality of specific photoelectric conversion elements in a case where the wavelength shift correction emission-line light is measured as the incident light at the reference temperature during the initial calibration with the spectrometer to be subjected to wavelength shift correction. From the second table stored in the second table information storage unit, the wavelength shift correcting unit determines the ratio of the second output ratio to the first output ratio corresponding to the temperature measured with the temperature measuring unit. From the first table stored in the first table information storage unit, the wavelength shift correcting unit determines the wavelength shift correction time emission-line wavelength corresponding to the determined ratio of the second output ratio to the first output ratio and each electrical signal that is output from the plurality of specific photoelectric conversion elements in a case where the wavelength shift correction emission-line light is measured as the incident light with the spectrometer to be subjected to wavelength shift correction. In the above wavelength shift correction system, the plurality of specific photoelectric conversion elements is preferably the two of first and second photoelectric conversion elements, and each of the predetermined first and second output ratios is preferably the ratio between first and second electrical signals that are output from the first and second photoelectric conversion elements, respectively. In the above wavelength shift correction system, the plurality of specific photoelectric conversion elements is preferably three or more photoelectric conversion elements, the wavelength shift correction emission-line light preferably includes a plurality of rays having different emission-line wavelengths from one another, and the first table information storage unit preferably stores a plurality of first tables corresponding to the respective rays of the wavelength shift correction emission-line light. From the second table stored in the second table information storage unit, for each of the rays of wavelength shift correction emission-line light, the wavelength shift correcting unit preferably determines the ratio of the second output ratio to the first output ratio corresponding to the temperature measured with the temperature measuring unit. From the first table stored in the first table information storage unit, the wavelength shift correcting unit preferably determines the wavelength shift correction time emission-line wavelength corresponding to the determined ratio of the second output ratio to the first output ratio and each electrical signal that is output from the plurality of specific photoelectric conversion elements corresponding to the wavelength shift correction emission-line light in a case where the wavelength shift correction emission-line light is measured as the incident light with the spectrometer to be subjected to wavelength shift correction. The wavelength shift correcting unit then preferably determines a wavelength variation from the difference between the determined wavelength shift correction time emission-line wavelength and the known emission-line wavelength of the wavelength shift correction emission-line light. The wavelength shift correcting unit preferably determines a wavelength variation from a representative value such as an average value or a median value on the basis of a plurality of wavelength variations determined with respect to the respective rays of the wavelength shift correction emission-line light.

In such a wavelength shift correction system, the first and second tables are stored beforehand into the first and second table information storage units, and thus, the wavelength shift correction time emission-line wavelength can be easily determined with the use of the first and second tables.

In another mode, in the above wavelength shift correction system, the wavelength shift correcting unit performs wavelength shift correction on the spectrometer to be subjected to wavelength shift correction, on the basis of the determined wavelength variation.

Such a wavelength shift correction system can automatically perform wavelength shift correction on the spectrometer to be subjected to wavelength shift correction, on the basis of the determined wavelength variation.

In another mode, in the above wavelength shift correction system, the wavelength shift correcting unit issues a warning to the effect that wavelength shift correction is necessary, on the basis of the determined wavelength variation.

Such a wavelength shift correction system can make the user recognize the necessity of wavelength shift correction.

In another mode, in the above wavelength shift correction system, the wavelength shift correction light source includes a neon lamp, and a bandpass filter that transmits the wavelength shift correction emission-line light from among a plurality of emission-line light rays emitted from the neon lamp.

Since such a wavelength shift correction system uses a neon lamp as the wavelength shift correction light source, the costs can be lowered.

In another mode, in the above wavelength shift correction system, the wavelength shift correction light source is incorporated in the spectrometer to be subjected to wavelength shift correction.

In such a wavelength shift correction system, the spectrometer to be subjected to wavelength shift correction includes the wavelength shift correction light source, and accordingly, there is no need to prepare the wavelength shift correction light source separately.

In another mode, in the above wavelength shift correction system, the wavelength shift correction light source is a structure independent of the spectrometer to be subjected to wavelength shift correction.

In such a wavelength shift correction system, the wavelength shift correction light source is a structure independent of the spectrometer to be subjected to wavelength shift correction. Accordingly, the spectrometer can be made smaller in size, and the wavelength shift correction light source is only required to be prepared at a time of wavelength shift correction as needed, and is not necessarily always prepared.

A wavelength shift correction method according to another mode includes: a wavelength shift correction light source that emits wavelength shift correction emission-line light; and a spectrometer including a spectroscopic unit that receives respective rays of dispersed spectral light obtained by dispersing incident light in accordance with wavelength with a plurality of photoelectric conversion elements arranged in the direction of dispersion, and outputs the respective electrical signals corresponding to the respective light intensities of the respective rays of dispersed spectral light, and a temperature measuring unit that measures the temperature of the spectroscopic unit, the spectrometer being a spectrometer to be subjected to wavelength shift correction, and performs wavelength shift correction on the spectrometer to be subjected to wavelength shift correction. The wavelength shift correction method includes: a first step of determining a wavelength shift correction time emission-line wavelength corresponding to the wavelength shift correction emission-line light on the basis of respective electrical signals output from a plurality of specific photoelectric conversion elements that receive the wavelength shift correction emission-line light in the plurality of photoelectric conversion elements when the wavelength shift correction emission-line light is measured as the incident light with the spectrometer to be subjected to wavelength shift correction, and the temperature measured by the temperature measuring unit; and a second step of determining a wavelength variation from the difference between the wavelength shift correction time emission-line wavelength determined in the first step and the known emission-line wavelength of the wavelength shift correction emission-line light, and performing wavelength shift correction on the spectrometer to be subjected to wavelength shift correction.

By such a wavelength shift correction method, the temperature of the spectroscopic unit is measured with the temperature measuring unit, and the wavelength shift correction time emission-line wavelength corresponding to the wavelength shift correction emission-line light is determined on the basis of the measured temperature. Thus, even in a case where the temperature at the time of calibration (initial calibration) during manufacture or before shipping is different from the temperature at a time of wavelength shift correction, for example, it is possible to reduce deterioration of the accuracy of wavelength shift correction.

This application is based on Japanese Patent Application No. 2017-159292, filed on Aug. 22, 2017, the contents of which are incorporated in this application.

While embodiments of the present invention have been illustrated and described in detail, these embodiments are merely illustrated examples and practical examples, and are not restrictive. The scope of the present invention should be construed in the language of the appended claims.

To express the present invention, the present invention has been appropriately and fully described above as embodiments with reference to the drawings. However, it should be understood that those skilled in the art can easily modify and/or improve the embodiments described above. Therefore, unless modifications or improvements implemented by those skilled in the art depart from the scope of the claims, the modifications or the improvements should be interpreted as inclusive in the scope of the claims.

INDUSTRIAL APPLICABILITY

According to the present invention, it is possible to provide a wavelength shift correction system and a wavelength shift correction method that correct wavelength shifts of a spectrometer.

The invention claimed is:

1. A wavelength shift correction system comprising:
a wavelength shift correction light source that emits wavelength shift correction emission-line light;
a spectrometer including: a spectroscopic part that receives, with a plurality of photoelectric conversion elements arranged in a direction of dispersion, respective rays of dispersed spectral light obtained by dispersing incident light in accordance with wavelength, and outputs respective electrical signals corresponding to respective light intensities of the respective rays of dispersed spectral light; and a temperature measurer that measures temperature of the spectroscopic part, the spectrometer being a spectrometer to be subjected to wavelength shift correction; and
a hardware processor that determines a wavelength shift correction time emission-line wavelength corresponding to the wavelength shift correction emission-line light on the basis of respective electrical signals output from a plurality of specific photoelectric conversion elements that receive the wavelength shift correction emission-line light in the plurality of photoelectric conversion elements when the wavelength shift correction emission-line light is measured as the incident light with the spectrometer to be subjected to wavelength shift correction, and the temperature measured by the temperature measurer, and determines a wavelength variation from a difference between the determined wavelength shift correction time emission-line wavelength and a known emission-line wavelength of the wavelength shift correction emission-line light.

2. The wavelength shift correction system according to claim 1, further comprising:
a first table information storage unit that stores a first table that shows, for each of wavelengths at predetermined wavelength intervals in a predetermined wavelength range including the emission-line wavelength of the wavelength shift correction emission-line light, a wavelength correspondence relationship between wavelength and a ratio of a sensitivity gain product that is a multiplication result obtained by multiplying a gain ratio of the spectroscopic part corresponding to the plurality of specific photoelectric conversion elements determined at a first temperature as the reference temperature at a time of predetermined initial calibration by a spectral sensitivity ratio of the plurality of specific photoelectric conversion elements; and
a second table information storage unit that stores a second table that shows, for each of temperatures at predetermined temperature intervals in a predetermined temperature range including the reference temperature, a temperature correspondence relationship between a second temperature and a ratio of a predetermined second output ratio based on each electrical signal that is output from the plurality of specific photoelectric conversion elements when the wavelength shift correction emission-line light is measured as the incident light at the second temperature with the spectrometer to be subjected to wavelength shift correction, to a predetermined first output ratio as a reference ratio based on each electrical signal that is output from the plurality of specific photoelectric conversion elements when the wavelength shift correction emission-line light is measured as the incident light at the reference temperature during the initial calibration with the spectrometer to be subjected to wavelength shift correction, wherein
from the second table stored in the second table information storage, the hardware processor determines the second output ratio to the first output ratio corresponding to the temperature measured with the temperature measurer, and from the first table stored in the first table information storage, the hardware processor determines the wavelength shift correction time emission-line wavelength corresponding to the determined second output ratio to the first output ratio and each electrical signal that is output from the plurality of specific photoelectric conversion elements when the wavelength shift correction emission-line light is measured as the incident light with the spectrometer to be subjected to wavelength shift correction.

3. The wavelength shift correction system according to claim 1, wherein
the hardware processor performs wavelength shift correction on the spectrometer to be subjected to wavelength shift correction, on the basis of the determined wavelength variation.

4. The wavelength shift correction system according to claim 1, wherein
the hardware processor issues a warning indicating that wavelength shift correction is necessary, on the basis of the determined wavelength variation.

5. The wavelength shift correction system according to claim 1, wherein
the wavelength shift correction light source includes a neon lamp, and a bandpass filter that transmits the wavelength shift correction emission-line light from among a plurality of emission-line light rays emitted from the neon lamp.

6. The wavelength shift correction system according to claim 1, wherein
the wavelength shift correction light source is incorporated in the spectrometer to be subjected to wavelength shift correction.

7. The wavelength shift correction system according to claim 1, wherein
the wavelength shift correction light source is independent of the spectrometer to be subjected to wavelength shift correction.

8. A wavelength shift correction method that includes: a wavelength shift correction light source that emits wavelength shift correction emission-line light; and a spectrometer including: a spectroscopic part that receives, with a plurality of photoelectric conversion elements arranged in a direction of dispersion, respective rays of dispersed spectral light obtained by dispersing incident light in accordance with wavelength, and outputs respective electrical signals corresponding to respective light intensities of the respective rays of dispersed spectral light; and a temperature measurer that measures temperature of the spectroscopic part, the spectrometer being a spectrometer to be subjected to wavelength shift correction, the wavelength shift correction method being for performing wavelength shift correction on the spectrometer to be subjected to wavelength shift correction, the wavelength shift correction method comprising:

determining a wavelength shift correction time emission-line wavelength corresponding to the wavelength shift correction emission-line light on the basis of respective electrical signals output from a plurality of specific photoelectric conversion elements that receive the wavelength shift correction emission-line light in the plurality of photoelectric conversion elements when the wavelength shift correction emission-line light is measured as the incident light with the spectrometer to be subjected to wavelength shift correction, and the temperature measured by the temperature measurer; and determining a wavelength variation from a difference between the wavelength shift correction time emission-line wavelength determined in the determining a wavelength shift correction time emission-line wavelength and a known emission-line wavelength of the wavelength shift correction emission-line light.

9. The wavelength shift correction system according to claim 2, wherein
the hardware processor performs wavelength shift correction on the spectrometer to be subjected to wavelength shift correction, on the basis of the determined wavelength variation.

10. The wavelength shift correction system according to claim 2, wherein
the hardware processor issues a warning indicating that wavelength shift correction is necessary, on the basis of the determined wavelength variation.

11. The wavelength shift correction system according to claim 2, wherein
the wavelength shift correction light source includes a neon lamp, and a bandpass filter that transmits the wavelength shift correction emission-line light from among a plurality of emission-line light rays emitted from the neon lamp.

12. The wavelength shift correction system according to claim 2, wherein
the wavelength shift correction light source is incorporated in the spectrometer to be subjected to wavelength shift correction.

13. The wavelength shift correction system according to claim 2, wherein
the wavelength shift correction light source is independent of the spectrometer to be subjected to wavelength shift correction.

14. The wavelength shift correction system according to claim 3, wherein
the hardware processor issues a warning indicating that wavelength shift correction is necessary, on the basis of the determined wavelength variation.

15. The wavelength shift correction system according to claim 3, wherein
the wavelength shift correction light source includes a neon lamp, and a bandpass filter that transmits the wavelength shift correction emission-line light from among a plurality of emission-line light rays emitted from the neon lamp.

16. The wavelength shift correction system according to claim 3, wherein
the wavelength shift correction light source is incorporated in the spectrometer to be subjected to wavelength shift correction.

17. The wavelength shift correction system according to claim 3, wherein
the wavelength shift correction light source is independent of the spectrometer to be subjected to wavelength shift correction.

18. The wavelength shift correction system according to claim 4, wherein
the wavelength shift correction light source includes a neon lamp, and a bandpass filter that transmits the wavelength shift correction emission-line light from among a plurality of emission-line light rays emitted from the neon lamp.

19. The wavelength shift correction system according to claim 4, wherein
the wavelength shift correction light source is incorporated in the spectrometer to be subjected to wavelength shift correction.

20. The wavelength shift correction system according to claim 4, wherein
the wavelength shift correction light source is independent of the spectrometer to be subjected to wavelength shift correction.

* * * * *